United States Patent
Xiao et al.

(10) Patent No.: US 11,259,502 B2
(45) Date of Patent: Mar. 1, 2022

(54) INTELLIGENT PET MONITORING METHOD FOR ROBOT

(71) Applicant: AMICRO SEMICONDUCTOR CO., LTD., Guangdong (CN)

(72) Inventors: Gangjun Xiao, Guangdong (CN); Taiming Huang, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 0 days.

(21) Appl. No.: 16/978,200

(22) PCT Filed: Aug. 6, 2018

(86) PCT No.: PCT/CN2018/098911
§ 371 (c)(1),
(2) Date: Sep. 4, 2020

(87) PCT Pub. No.: WO2019/179001
PCT Pub. Date: Sep. 26, 2019

(65) Prior Publication Data
US 2021/0037793 A1 Feb. 11, 2021

(30) Foreign Application Priority Data
Mar. 20, 2018 (CN) .......................... 201810227201.3

(51) Int. Cl.
*A01K 29/00* (2006.01)
*A01K 11/00* (2006.01)
(Continued)

(52) U.S. Cl.
CPC .......... *A01K 29/005* (2013.01); *A01K 11/006* (2013.01); *H04W 4/021* (2013.01); *H04B 1/707* (2013.01)

(58) Field of Classification Search
CPC .. A01K 11/006; A01K 15/023; A01K 29/005; H04B 1/707; H04N 7/18; H04W 4/021; H04W 4/024
See application file for complete search history.

(56) References Cited

U.S. PATENT DOCUMENTS

| 9,654,925 | B1 | 5/2017 | Solinsky et al. |
| 2004/0093219 | A1 | 5/2004 | Shin et al. |
| 2021/0169049 | A1* | 6/2021 | Xiao ..................... G05D 1/0246 |

FOREIGN PATENT DOCUMENTS

| CN | 101278654 A | 10/2008 |
| CN | 103813446 A | 5/2014 |

(Continued)

*Primary Examiner* — Nader Bolourchi
(74) *Attorney, Agent, or Firm* — Gang Yu

(57) ABSTRACT

The present disclosure provides an intelligent pet monitoring method for a robot. A mutual position relationship between a pet and a robot is determined according to wireless communication between a wireless signal device on the pet and the robot, and then a grid position corresponding to the pet in a grid map constructed by the robot is determined according to the mutual position relationship. Daily activities of the pet may also be regular, to a certain extent, under the influence of a biological clock of the pet, so that big data generated by the grid positions of the pet at different time points is finally recorded to construct the pet daily activity model, and the daily activity trajectory of the pet may be predicted according to the pet daily activity model.

15 Claims, 7 Drawing Sheets

(51) Int. Cl.
*H04W 4/021* (2018.01)
*H04B 1/707* (2011.01)

(56) References Cited

FOREIGN PATENT DOCUMENTS

| | | |
|---|---|---|
| CN | 105744223 A | 7/2016 |
| CN | 106304332 A | 1/2017 |
| CN | 106584472 A | 4/2017 |
| CN | 106780620 A | 5/2017 |
| CN | 206150147 U | 5/2017 |
| CN | 106982741 A | 7/2017 |
| CN | 107566743 A | 1/2018 |
| CN | 107671859 A | 2/2018 |
| CN | 108366343 A | 8/2018 |

\* cited by examiner

INTELLIGENT PET MONITORING METHOD FOR ROBOT

TECHNICAL FIELD

The present disclosure relates to the field of robots, and in particular to an intelligent pet monitoring method for a robot.

BACKGROUND

At present, a pet robot may communicate with a positioning device worn on a pet to determine a position of the pet, thereby tracking the pet and monitoring a state of the pet through a camera. However, most of existing pets are cats and dogs, and these pets are relatively active and may run relatively fast. Consequently, when a positioning and tracking shooting manner is adopted, a robot may spend most of time on the way to track the pet, an achieved pet monitoring effect may be relatively poor, and the efficiency is relatively low.

SUMMARY

At least some embodiments of the present disclosure provide an intelligent pet monitoring method for a robot. A relatively good intelligent monitoring effect may be achieved according to an activity trajectory of a pet. The present disclosure is implemented through the following specific technical solutions.

An intelligent pet monitoring method for a robot may include the following steps:

a mutual position relationship between a pet and the robot is determined according to wireless communication between the robot and a wireless signal device on the pet;

a grid position corresponding to the pet in a grid map constructed by the robot is determined according to the mutual position relationship;

grid positions of the pet at different time points are recorded, statistics on recorded time information and corresponding grid position information is made, and a pet daily activity model configured to predict an activity trajectory of the pet is constructed; and the pet is monitored according to the pet daily activity model.

In an optional embodiment, the operation that the mutual position relationship between the pet and the robot is determined according to wireless communication between the robot and the wireless signal device on the pet may include the following steps:

it is determined that a distance between a first Ultra Wideband (UWB) positioning base station and a second UWB positioning base station on a body of the robot is W;

it is determined that a coordinate of the first UWB positioning base station is (X11, Y11) and a coordinate of the second UWB positioning base station is (X12, Y12);

according to wireless communication between each of the first UWB positioning base station and the second UWB positioning base station and a UWB positioning tag on the pet, it is determined that a first distance between the UWB positioning tag and the first UWB positioning base station is R1 and a second distance between the UWB positioning tag and the second UWB positioning base station is R2;

it is determined that an included angle between lines taking the first UWB positioning base station as an angular vertex and pointing to the second UWB positioning base station and the UWB positioning tag respectively is a first included angle, the first included angle being α1 and α1=arccos((W²+R2²−R1²)/(2*W*R2));

it is determined that an included angle between lines taking the second UWB positioning base station as an angular vertex and pointing to the first UWB positioning base station and the UWB positioning tag respectively is a second included angle, the second included angle being α2 and α2=arccos((W²+R1²−R2²)/(2*W*R1)); and it is determined that a coordinate of a present position point of the UWB positioning tag is (Xc, Yc), Xc=X12+R2*cos(180°−α1−arccos((X12−X11)/W)) and Yc=Y11+R1*cos(180°−α2−arcsin((X12−X11)/W)).

In an optional embodiment, the operation that it is determined that the coordinate of the first UWB positioning base station is (X11, Y11) and the coordinate of the second UWB positioning base station is (X12, Y12) may include the following steps:

a coordinate of a center point of the body of the robot is determined as a coordinate of a present position point of the robot, the coordinate being (X1, Y1);

it is determined that the center point of the body of the robot is at a midpoint of a connecting line of the first UWB positioning base station and the second UWB positioning base station;

it is determined that the distance between the first UWB positioning base station and the second UWB positioning base station is W, a distance between the center point of the body of the robot and the first UWB positioning base station is W/2 and a distance between the center point of the body of the robot and the second UWB positioning base station is W/2;

it is determined that a present direction, detected by a gyroscope of the robot, of the robot is α;

it is determined that the coordinate of the first UWB positioning base station on the body of the robot is (X11, Y11), X11=X1−((W*cos α)/2) and Y11=Y1+((W*sin α)/2); and it is determined that the coordinate of the second UWB positioning base station on the body of the robot is (X12, Y12), X12=X1+((W*cos α)/2) and Y12=Y1−((W*sin α)/2).

In an optional embodiment, the operation that it is determined, according to wireless communication between each of the first UWB positioning base station and the second UWB positioning base station and the UWB positioning tag on the pet, that the first distance between the UWB positioning tag and the first UWB positioning base station is R1 and the second distance between the UWB positioning tag and the second UWB positioning base station is R2 may include the following steps:

it is determined that a propagation speed of a radio wave is c;

it is determined that a time period between sending distance measurement data from the first UWB positioning base station to the UWB positioning tag and receiving a confirmation signal from the UWB positioning tag is T11;

it is determined that a time period between receiving the distance measurement data sent from the first UWB positioning base station to the UWB positioning tag and sending the confirmation signal from to the UWB positioning tag is T12;

it is determined that a time period between sending of distance measurement data from the UWB positioning tag to the first UWB positioning base station and receiving a confirmation signal from the first UWB positioning base station is T13;

it is determined that a time period between receiving the distance measurement data sent from the UWB positioning tag to the first UWB positioning base station and sending the confirmation signal from the first UWB positioning base station is T14;

it is determined that the first distance between the UWB positioning tag and the first UWB positioning base station is R1, R1=c*(T11−T12+T13−T14)/4;

it is determined that a time period between sending distance measurement data from the second UWB positioning base station to the UWB positioning tag and receiving a confirmation signal from the UWB positioning tag is T21;

it is determined that a time period between receiving the distance measurement data sent from the second UWB positioning base station to the UWB positioning tag to sending of the confirmation signal from the UWB positioning tag is T22;

it is determined that a time period between sending distance measurement data from the UWB positioning tag to the second UWB positioning base station and receiving a confirmation signal from the second UWB positioning base station is T23;

it is determined that a time period between receiving the distance measurement data sent from the UWB positioning tag to the second UWB positioning base station and sending the confirmation signal from the second UWB positioning base station is T24; and it is determined that the second distance between the UWB positioning tag and the second UWB positioning base station is R2, R2=c*(T21−T22+T23−T24)/4.

In an optional embodiment, the operation that the grid position corresponding to the pet in the grid map constructed by the robot is determined according to the mutual position relationship may include the following steps:

the grid map based on an XY-axis coordinate system taking (X0, Y0) as an origin is constructed according to data detected by the robot in a walking process;

it is determined that a side length of each grid cell in the grid map is L;

according to own positioning data of the robot, it is determined that the coordinate of the present position point of the robot is (X1, Y1) and a grid coordinate of a grid cell corresponding to the present position point is (S11, S12), S11=(X1−X0)/L, S12=(Y1−Y0)/L and both S11 and S12 being integers; and according to the coordinate (X1, Y1) of the robot, it is determined that a grid coordinate corresponding to a position point of the pet is (S21, S22), S21=(X1+((W*cos α/2)+R2*cos(180°−α1−arccos(cos α))−X0)/L, S22=(Y1+((W*sin α)/2)+R1*cos(180°−α2−arcsin(cos α))−Y0)/L, and both S21 and S22 being integers.

In an optional embodiment, the operation that the grid positions of the pet at different time points are recorded, statistics on the recorded time information and corresponding grid position information is made and the pet daily activity model configured to predict the activity trajectory of the pet is constructed may include the following steps:

the XY-axis coordinate system is constructed by taking a preset time interval as an X axis and taking a grid coordinate point as a Y axis;

a grid coordinate point corresponding to a position point of the pet at the different time points on the Y axis is determined by taking the preset time interval as a time period from the origin along a time extension direction of the X axis in a first time period, and the determined grid coordinate points are sequentially connected to form a first activity trajectory;

a grid coordinate point corresponding to a position point of the pet at the different time points on the Y axis is determined from the origin along the time extension direction of the X axis in a second time period, and the determined grid coordinate points are sequentially connected to form a second activity trajectory;

a grid coordinate point corresponding to a position point of the pet at the different time points on the Y axis is determined from the origin along the time extension direction of the X axis in a third time period, and the determined grid coordinate points are sequentially connected to form a third activity trajectory; and an activity trajectory formed in each time period is continuously recorded in the same manner.

In an optional embodiment, the operation that the pet is monitored according to the pet daily activity model may include the following steps:

relatively dense activity trajectories are determined according to an activity trajectory distribution condition in the pet daily activity model;

time points corresponding to the relatively dense activity trajectories is determined as predicted stay time points, and grid coordinates corresponding to the relatively dense activity trajectories are determined as predicted stay positions;

whether a straight-line distance between the pet and the robot is longer than a preset distance or not is determined according to a present position of the robot and a present position of the pet;

when the straight-line distance is not longer than the preset distance, a present tracking and monitoring state is kept;

when the straight-line distance is longer than the preset distance, whether a time difference between a present time point and first predicted stay time point after the present time point is less than a set time period or not is determined;

when the time difference is not less than the set time period, the present tracking and monitoring state is kept;

when the time difference is less than the set time period, the predicted stay position corresponding to the first predicted stay time point after the present time point is determined, and a monitoring position point is determined according to the present position of the pet and the predicted stay position such that a shooting angle of a camera of the robot covers the present position of the pet and the predicted stay position when the robot is at the monitoring position point; and the robot is controlled to walk to the monitoring position point to monitor the pet.

In an optional embodiment, the relatively dense activity trajectories may be activity trajectories in the same grid coordinate range in a certain time interval, and a ratio of the number of the relatively dense activity trajectories to the number of all activity trajectories in the same time interval is greater than a preset numerical value.

In an optional embodiment, the operation that the present tracking and monitoring state is kept may include the following steps:

whether a distance between the robot and the pet is less than or equal to a set distance or not is determined;

when the distance is not less than or equal to the set distance, the monitoring position point is re-determined, and the robot is controlled to walk to the monitoring position point to monitor the pet;

when the distance is less than or equal to the set distance, whether there is an obstacle cell or not in grid cells in a preset range covered by a shooting angle of a camera through which the robot monitors the pet between a grid cell where the robot is located and a grid cell where the pet is located is determined;

when there is none obstacle cell in grid cells in the preset range, the camera of the robot is kept facing a shooting direction of the pet; and when there is the obstacle cell in grid cells in the preset range, the monitoring position point is re-determined, and the robot is controlled to walk to the monitoring position point to monitor the pet.

In an optional embodiment, the operation that the monitoring position point is re-determined may include the following steps:

a preset region taking the grid cell where the pet is located as a center point is determined, passed cells are determined as undetermined monitoring cells one by one from short to long distance relationships between the passed cells in the preset region and the robot, and whether there is an obstacle cell or not in a straight grid path between the undetermined monitoring cell and the grid cell where the pet is located is determined;

when there is none obstacle cell in the straight grid path, the undetermined monitoring cell is determined as a monitoring cell, and a center point of the monitoring cell is determined as the monitoring position point;

when there is the obstacle cell in the straight grid path, whether the next passed cell is farthest from the robot or not is determined;

when the next passed cell is farthest from the robot, the next passed cell is directly determined as a monitoring cell, and a center point of the monitoring cell is determined as the monitoring position point; and when the next passed cell is not farthest from the robot, the next passed cell is determined as an undetermined monitoring cell, and the step that whether there is the obstacle cell or not in the straight grid path between the undetermined monitoring cell and the grid cell where the pet is located is determined is continued, the obstacle cell being a corresponding grid cell when the robot detects an obstacle and the passed cell being a grid cell that the robot has passed.

In an optional embodiment, the operation that the monitoring position point is determined according to the present position of the pet and the predicted stay position may include the following steps:

Step 1: a grid cell corresponding to the present position of the pet is determined as a first cell, and a grid cell corresponding to the predicted stay position is determined as a second cell;

Step 2: a passed cell closest to the robot on a perpendicular bisector of a connecting line of the first cell and the second cell is determined as a third cell;

Step 3: whether an included angle between a connecting line from the first cell to the third cell and a connecting line from the second cell to the third cell is smaller than the shooting angle of the camera of the robot or not is determined;

when the included angle is not smaller than the shooting angle, Step 4 is entered;

Step 4: in an extension direction, far away from the first cell and the second cell, of the perpendicular bisector of the connecting line of the first cell and the second cell passed cells arranged from short to long distances with the third cell are sequentially determined as new third cells, and Step 3 is re-executed;

when the included angle is smaller than the shooting angle, Step 5 is entered;

Step 5: whether there is an obstacle cell or not in a straight grid path from the third cell to the first cell and whether there is an obstacle cell or not in a straight grid path from the third cell to the second cell are determined;

when there is none obstacle cell in the straight grid path from the third cell to the first cell and there is none obstacle cell in the straight grid path from the third cell to the second cell, Step 6 is entered;

Step 6: a center point of a grid cell corresponding to the third cell is determined as the monitoring position point;

when there is the obstacle cell in the straight grid path from the third cell to the first cell and/or there is the obstacle cell in the straight grid path from the third cell to the second cell, Step 7 is entered;

Step 7: in an extension direction of a parallel line passing through the third cell and parallel to the connecting line of the first cell and the second cell, passed cells that the parallel line passes through are sequentially determined as new third cells, and whether the new third cell is a passed cell closest to a boundary of the grid map or not is determined;

when the new third cell is not the passed cell closest to the boundary of the grid map, Step 5 is re-executed; and when the new third cell is the passed cell closest to the boundary of the grid map, passed cells arranged from short to long distances with the passed cell closest to the robot on the perpendicular bisector of the connecting line of the first cell and the second cell are sequentially determined as new third cells, and Step 5 is re-executed.

In an optional embodiment, the operation that the robot is controlled to walk to the monitoring position point to monitor the pet may include the following steps:

the grid map is searched by taking the present position point of the robot as a starting point and taking a direction pointed from the present position point to the monitoring cell as a searching direction;

a grid path with a smallest path length in grid paths directly connected by passed cells between the present position point of the robot and the center point of the monitoring cell is determined as a navigation grid path;

center points of grid cells in the navigation grid path are determined as navigation position points, and the navigation position points are connected into a navigation path;

the robot is controlled to walk along the navigation path from the present position point to the monitoring position point; and a direction of the robot is regulated to ensure that the shooting direction of the camera of the robot points to a direction of the pet.

At least some embodiments of the present disclosure have the following beneficial effects. The mutual position relationship between the pet and the robot is determined according to the wireless communication between the wireless signal device on the pet and the robot, and then the grid position corresponding to the pet in the grid map constructed by the robot is determined according to the mutual position relationship. Daily activities of the pet may also be regular, to a certain extent, under the influence of a biological clock of the pet, so that big data generated by the grid positions of the pet at different time points is finally recorded to construct the pet daily activity model, and the daily activity trajectory of the pet may be predicted according to the pet daily activity model. Therefore, a relatively good monitoring position and monitoring angle may be intelligently selected, the problems of poor monitoring efficiency and effect caused by the condition that an existing robot runs after a pet are solved, and the pet monitoring efficiency and effect of the robot are improved.

BRIEF DESCRIPTION OF THE DRAWINGS

FIG. 7 is an analysis schematic diagram of determining a monitoring position point according to a present position of a pet and a predicted stay position according to a first exemplary embodiment of the present disclosure.

FIG. 8 is an analysis schematic diagram of determining a monitoring position point according to a present position of a pet and a predicted stay position according to a second exemplary embodiment of the present disclosure.

DETAILED DESCRIPTION

Specific implementation modes of the present disclosure will further be described below in combination with the drawings.

A robot of at least some embodiments of the present disclosure is one of intelligent household appliances and may automatically walk in some scenarios by virtue of certain artificial intelligence. A body of the robot is provided with various sensors, may detect a walking distance, a walking angle, a body state, an obstacle and the like, for example, may automatically turn in front of a wall or another obstacle, may walk along different routes as planned according to different settings and may also construct a grid map according to various data detected in a walking process. The mobile robot of at least some embodiments of the present disclosure includes the following structures: the body of the robot with a driving wheel and capable of autonomously walking, a human-computer interaction interface arranged on the body and an obstacle detection element arranged on the body. A camera is arranged on an upper end face of a middle part of the body. Of course, the camera may also be arranged on an upper end face of a front part of the body or at another position. When the camera is arranged at the front part of the body or the other position and a related parameter is calculated, a related numerical value is required to be correspondingly regulated relative to the camera arranged at the middle part. An inertia sensor is arranged in the body, and the inertia sensor includes an accelerometer, a gyroscope and the like. An odometer (usually a code disc) configured to detect the walking distance of the driving wheel is arranged on the driving wheel, and a control component capable of processing a parameter of the related sensor and outputting a control signal to an execution component is also arranged.

Figure 1:
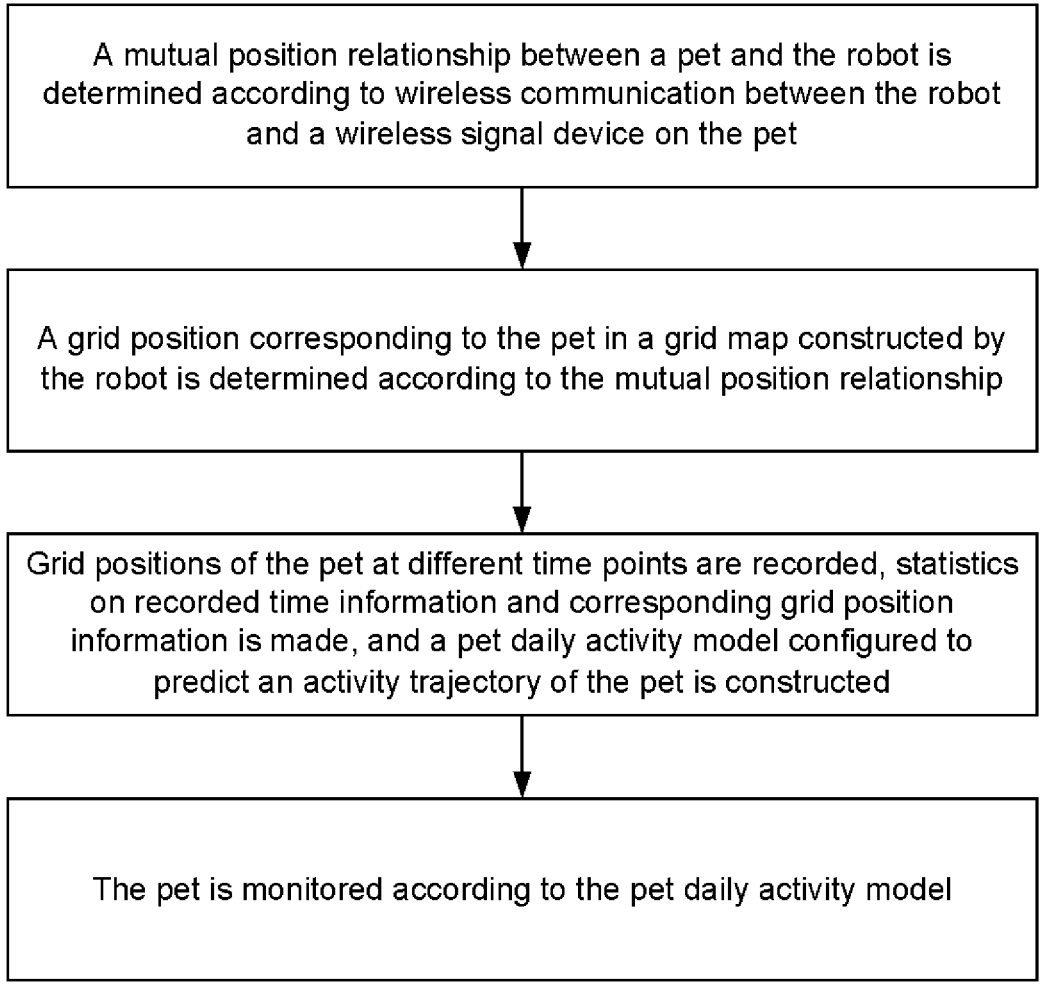
FIG. 1 is a flowchart of an intelligent pet monitoring method for a robot according to an embodiment of the present disclosure.

An intelligent pet monitoring method for a robot in the present disclosure, as shown in FIG. 1, includes the following steps: a mutual position relationship between a pet and the robot is determined according to wireless communication between the robot and a wireless signal device on the pet; a grid position corresponding to the pet in a grid map constructed by the robot is determined according to the mutual position relationship; grid positions of the pet at different time points are recorded, statistics on recorded time information and corresponding grid position information is made, and a pet daily activity model configured to predict an activity trajectory of the pet is constructed; and the pet is monitored according to the pet daily activity model. The grid map is a map constructed by the robot in a walking process according to data detected by various sensors thereof and taking grid cell as a basic unit. The grid cell is a virtual check with a set length and width, may be set to be a square and may also be set to be a rectangle. Optionally, the grid cell of the present disclosure is a square check with a side length of 0.2 meters. The wireless signal device may adopt a ZigBee communication component, an ultrasonic component, a radio frequency communication component, a UWB component, a Wireless Fidelity (WIFI) component or the like, and specifically, is selected according to different requirements of a product. In the walking process, the robot may mark a passed grid cell as a passed cell, mark a corresponding grid cell where an obstacle is detected as an obstacle cell, mark a corresponding grid cell when a cliff is detected as a cliff cell, etc. and update the grid map according to marked information. According to the method of the present disclosure, the mutual position relationship between the pet and the robot is determined according to the wireless communication between the wireless signal device on the pet and the robot, and then the grid position corresponding to the pet in the grid map constructed by the robot is determined according to the mutual position relationship. Daily activities of the pet may also be regular, to a certain extent, under the influence of a biological clock of the pet, so that big data generated by the grid positions of the pet at different time points is finally recorded to construct the pet daily activity model, and the daily activity trajectory of the pet may be predicted according to the pet daily activity model. Therefore, a relatively good monitoring position and monitoring angle may be intelligently selected, the problems of poor monitoring efficiency and effect caused by the condition that an existing robot runs after a pet are solved, and the pet monitoring efficiency and effect of the robot are improved.

Figure 2:
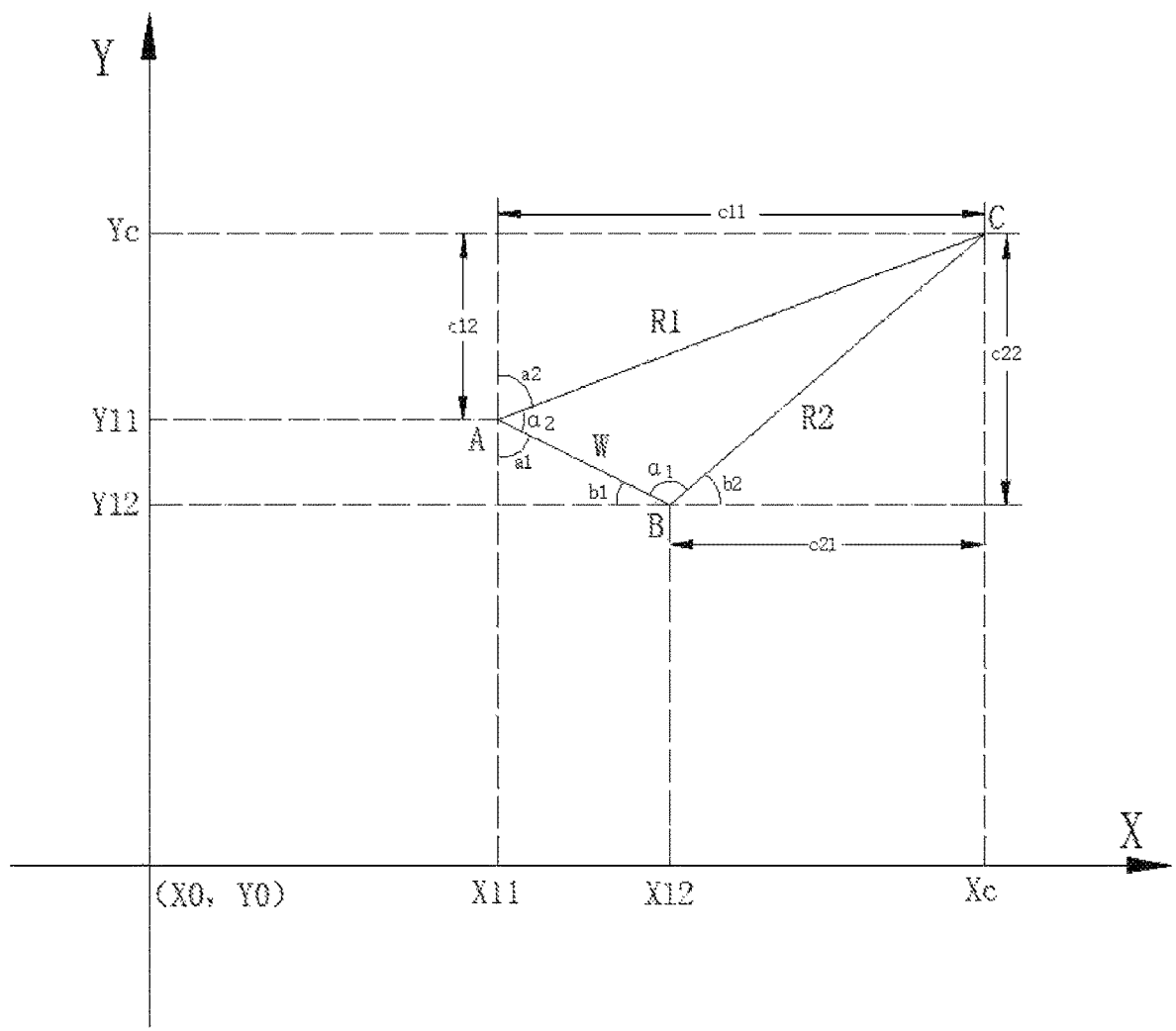
FIG. 2 is an analysis schematic diagram of a mutual position of two UWB positioning base stations and a UWB positioning tag according to an exemplary embodiment of the present disclosure.

Optionally, the operation that the mutual position relationship between the pet and the robot is determined according to wireless communication between the robot and the wireless signal device on the pet includes the following steps: it is determined that a distance between a first UWB positioning base station and a second UWB positioning base station on a body of the robot is W; it is determined that a coordinate of the first UWB positioning base station is (X11, Y11) and a coordinate of the second UWB positioning base station is (X12, Y12); according to wireless communication between each of the first UWB positioning base station and the second UWB positioning base station and a UWB positioning tag on the pet, it is determined that a first distance between the UWB positioning tag and the first UWB positioning base station is R1 and a second distance between the UWB positioning tag and the second UWB positioning base station is R2; it is determined that an included angle between lines taking the first UWB positioning base station as an angular vertex and pointing to the second UWB positioning base station and the UWB positioning tag respectively is a first included angle, the first included angle being $\alpha 1$ and $\alpha 1 = \arccos((W^2+R2^2-R1^2)/(2*W*R2))$; it is determined that an included angle between lines taking the second UWB positioning base station as an angular vertex and pointing to the first UWB positioning base station and the UWB positioning tag respectively is a second included angle, the second included angle being $\alpha 2$ and $\alpha 2 = \arccos((W^2+R1^2-R2^2)/(2*W*R1))$; and it is determined that a coordinate of a present position point of the UWB positioning tag is (Xc, Yc), $Xc=X12+R2*\cos(180°-\alpha 1-\arccos((X12-X11)/W))$ and $Yc=Y11+R1*\cos(180°-\alpha 2-\arcsin((X12-X11)/W))$. UWB is a UWB carrierless communication technology, and the UWB positioning tag and the UWB positioning base station are communication devices adopting the UWB communication technology. As shown in FIG. 2, A is the first UWB positioning base station, B is the second UWB positioning base station, and C is the UWB positioning tag. Both the first UWB positioning base station and the second UWB positioning base station are assembled on the body of the robot, and the UWB positioning tag is worn on the pet.

Since the distance between the first UWB positioning base station and the second UWB positioning base station has been determined when the robot is designed and produced, the distance between the first UWB positioning base station and the second UWB positioning base station is known, namely AB=W, and related data has been recorded in a system. A numerical value of W may be set according to a specific product design, and the numerical value of W should be less than a diameter of the body of the robot. In addition, it is measured that the distance between the first UWB positioning base station and the UWB positioning tag is AC=R1 and the distance between the second UWB positioning base station and the UWB positioning tag is BC=R2, a magnitude of the first included angle ($\angle$ABC) may be calculated according to three side lengths of the triangle, namely $\alpha 1 = \arccos((W^2+R2^2-R1^2)/(2*W*R2))$, and a magnitude of the second included angle ($\angle$CAB) is calculated in the same manner, namely $\alpha 2 = \arccos((W^2+R1^2-R2^2)/(2*W*R1))$. Since the robot may determine the coordinate position of the robot (i.e., a coordinate of a center point of the robot) according to the data detected by a sensor such as an odometer and a gyroscope, coordinate values of the two UWB positioning base stations at fixed positions relative to the center point on the body of the robot may also be determined, namely the coordinate of the first UWB positioning base station is (X11, Y11) and the coordinate of the second UWB positioning base station is (X12, Y12). A specific calculation manner will be described in the following embodiments. It can be seen from the figure that, for determining an X-axis coordinate of a point C, it is necessary to know a length c11 or c21, $c11=R1*\sin a2$, $c21=R2*\cos b2$, $\angle a2=180°-\alpha 2\angle a1$, $\angle b2=180°-\alpha 1-\angle b1$, $\angle a1=\arcsin((X12-X11)/W)$ and $\angle b1=\arccos((X12-X11)/W)$, and the angles $\alpha 1$ and $\alpha 2$ have been calculated before, so that $c11=R1*\sin(180°-\alpha 2-\arcsin((X12-X11)/W))$ and $c21=R2*\cos(180°-\alpha 1-\arcsin((Y11-Y12)/W))$ are calculated. And in such case, the X-axis coordinate of the point C where the pet is located is $Xc=X12+c21=X12+R2*co(180°-\alpha 1-\arccos((X12-X11)/W))$ or $Xc=X11+c11=X11+R1*\sin(180°-\alpha 2-\arcsin((X12-X11)/W))$. Similarly, for determining a Y-axis coordinate of the point C, it is necessary to know a length c12 or c22, $c12=R1*\cos a2$, $c22=R2*\sin b2$, $\angle a2=180°-\alpha 2-\angle a1$, $\angle b2=180°-\alpha 1-\angle b1$, $\angle a1=\arcsin((X12-X11)/)$, $\angle b1=\arccos((X12-X11)/W)$ and the angles $\alpha 1$ and $\alpha 2$ have been calculated before, so that $c12=R1*\cos(180°-\alpha 2-\arcsin((X12-X11)/W))$ and $c22=R2*\sin(180°-\alpha 1-\arccos((X12-X11)/W))$ are calculated. And in such case, the Y-axis coordinate of the point C where the pet is located is $Yc=Y11+c12=Y11+R1*\cos(180°-a2-\arcsin((X12-X11)/W))$ or $Yc=Y12+c22=Y12+R2*\sin(180°-a1-\arccos((X12-X11)/W))$. The method of the present disclosure is applied to the condition that a height of the UWB positioning tag worn on the pet and heights of the UWB positioning base stations of the robot are consistent (namely the three communication devices are on the same horizontal plane) or not greatly different. When positions of the robot and the pet change, a detected change parameter may be substituted to rapidly obtain a coordinate position of the pet, a data processing speed is high, and an output result is accurate. In addition, when difference values between the height of the UWB positioning tag and the heights of the UWB positioning base stations are relatively great, a third UWB positioning base station is required to be arranged on the body of the robot, and a height parameter is introduced to determine a three-dimensional coordinate of the UWB positioning tag to further determine a corresponding grid coordinate. A specific implementation manner adopts the same principle of the embodiment and will not be elaborated herein.

Figure 3:
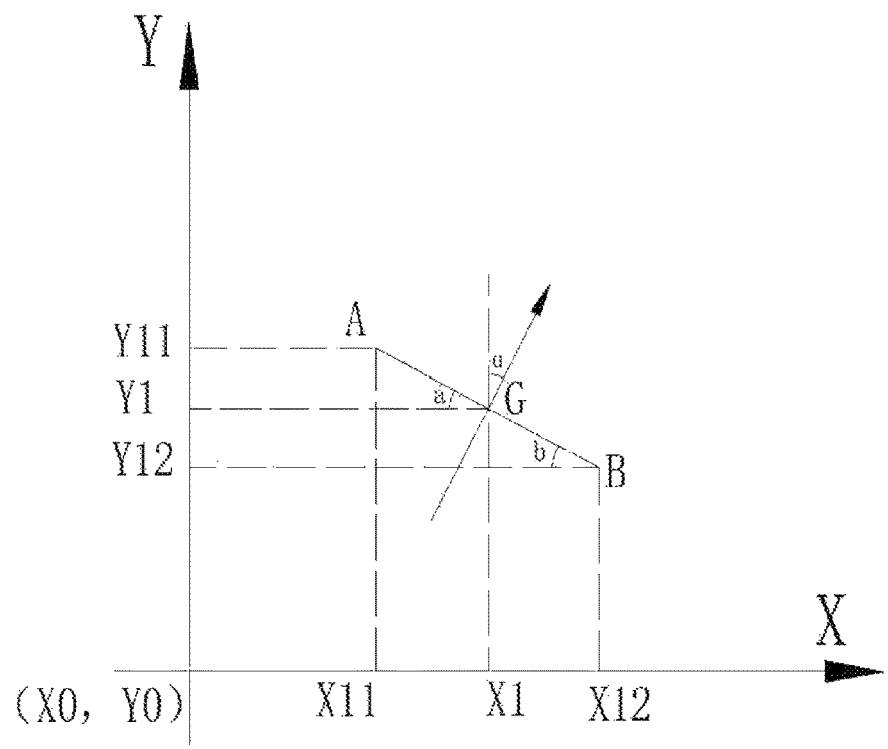
FIG. 3 is an analysis schematic diagram of calculating coordinates of two UWB positioning base stations based on a coordinate of a center point of a robot according to an exemplary embodiment of the present disclosure.

Optionally, the operation that it is determined that the coordinate of the first UWB positioning base station is (X11, Y11) and the coordinate of the second UWB positioning base station is (X12, Y12) includes the following steps: a coordinate of a center point of the body of the robot is determined as a coordinate of a present position point of the robot, the coordinate being (X1, Y1); it is determined that the center point of the body of the robot is at a midpoint of a connecting line of the first UWB positioning base station and the second UWB positioning base station; it is determined that the distance between the first UWB positioning base station and the second UWB positioning base station is W, a distance between the center point of the body of the robot and the first UWB positioning base station is W/2 and a distance between the center point of the body of the robot and the second UWB positioning base station is W/2; it is determined that a present direction, detected by a gyroscope of the robot, of the robot is $\alpha$; it is determined that the coordinate of the first UWB positioning base station on the body of the robot is (X11, Y11), $X11=X1-((W*\cos \alpha)/2)$ and $Y11=Y1+((W*\sin \alpha)/2)$; and it is determined that the coordinate of the second UWB positioning base station on the body of the robot is (X12, Y12), $X12=X1+((W*\cos \alpha)/2)$ and $Y12=Y1-((W*\sin \alpha)/2)$. As shown in FIG. 3, the first UWB positioning base station A and the second UWB positioning base station B are arranged at two ends of the body of the robot respectively, the connecting line of AB passes through the center point G of the robot, and AG=BG=W/2. The coordinate of the point G is (X1, Y1), and an angle of a present direction of the robot is α. In the figure, the arrowed straight line passing through the point G represents the present direction of the robot, and the straight line is intersected with the line AB at a right angle. Therefore, ∠a=∠b=∠α may be obtained. For calculating the X-axis coordinate X11 of the first UWB positioning base station, it is necessary to calculate a distance between X11 and X1 at first, namely X1−X11=AG*cos a=(W*cos α)/2, and in such case, X11=X1−((W*cos α)/2). For calculating the Y-axis coordinate Y11 of the first UWB positioning base station, it is necessary to calculate a distance between Y11 and Y1, namely Y11−Y1=AG*sin a=(W*sin α)/2, and in such case, Y11=Y1+((W*sin α)/2). Similarly, for calculating the X-axis coordinate X12 of the second UWB positioning base station, it is necessary to calculate a distance between X12 and X1, namely X12−X1=BG*cos b=W*cos α/2, and in such case, X12=X1+((W*cos α)/2). A distance between Y1 and Y12 is Y1−Y12=GB*sin b=W*sin α/2, and in such case, Y12=Y1−((W*sin α)/2). According to the method of the embodiment for determining the coordinates of the first UWB positioning base station and the second UWB positioning base station, an algorithm for determining the coordinates of the two base stations may be simplified by limiting the position relationship that the base stations are mutually symmetric about the center point on the body of the robot, so that the data processing speed of the system is increased, and the coordinate values of the two base stations may be rapidly and accurately obtained to provide references for subsequent other data processing faster. Similarly, when three base stations are arranged, the third base station is arranged on a perpendicular bisector of AB, so that the algorithm may be simplified, and the data processing speed of the system may be increased. A specific implementation manner adopts the same principle of the embodiment and will not be elaborated herein.

Figure 4:
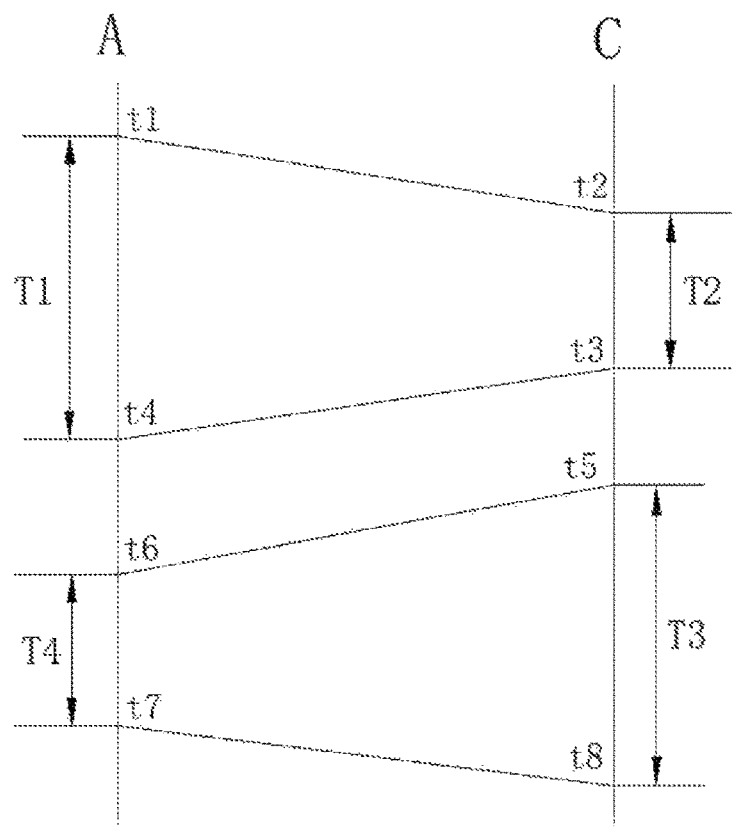
FIG. 4 is an analysis schematic diagram of determining a distance between a UWB positioning tag and a first UWB positioning base station according to an exemplary embodiment of the present disclosure.

Optionally, the operation that it is determined, according to the wireless communication between each of the first UWB positioning base station and the second UWB positioning base station and the UWB positioning tag on the pet, that the first distance between the UWB positioning tag and the first UWB positioning base station is R1 and the second distance between the UWB positioning tag and the second UWB positioning base station is R2 includes the following steps: it is determined that a propagation speed of a radio wave is c; it is determined that a time period between sending distance measurement data from the first UWB positioning base station to the UWB positioning tag and receiving a confirmation signal from the UWB positioning tag is T11; it is determined that a time period between receiving the distance measurement data sent from the first UWB positioning base station to the UWB positioning tag and sending the confirmation signal from to the UWB positioning tag is T12; it is determined that a time period between sending distance measurement data from the UWB positioning tag to the first UWB positioning base station and receiving a confirmation signal from the first UWB positioning base station is T13; it is determined that a time period between receiving the distance measurement data sent from the UWB positioning tag to the first UWB positioning base station and sending the confirmation signal from the first UWB positioning base station is T14; it is determined that the first distance between the UWB positioning tag and the first UWB positioning base station is R1, R1=c*(T11−T12+T13−T14)/4; it is determined that a time period between sending distance measurement data from the second UWB positioning base station to the UWB positioning tag and receiving a confirmation signal from the UWB positioning tag is T21; it is determined that a time period between receiving the distance measurement data sent from the second UWB positioning base station to the UWB positioning tag and sending the confirmation signal from the UWB positioning tag is T22; it is determined that a time period between sending distance measurement data from the UWB positioning tag to the second UWB positioning base station and receiving a confirmation signal from the second UWB positioning base station is T23; it is determined that a time period between receiving the distance measurement data sent from the UWB positioning tag to the second UWB positioning base station and sending the confirmation signal from the second UWB positioning base station is T24; and it is determined that the second distance between the UWB positioning tag and the second UWB positioning base station is R2, R2=c*(T21−T22+T23−T24)/4. As shown in FIG. 4, the first UWB positioning base station A sends the distance measurement data to the UWB positioning tag C at a moment t1, the UWB positioning tag receives the distance measurement data at a moment t2 and sends the confirmation signal at a moment t3, and the first UWB positioning base station A receives the confirmation signal at a moment t4. In such case, it may be obtained that the time period required by the first UWB positioning base station A between sending the distance measurement data and receiving the confirmation signal is T1=t4−t1 and the time period required by the UWB positioning tag C between receiving the distance measurement data and sending of the confirmation signal is T2=t3−t2, and it may be obtained that time period for signal transmission during a two-way communication between the first UWB positioning base station A and the UWB positioning tag C is T1−T2=t4−t1−t3+t2. Similarly, the UWB positioning tag C sends the distance measurement data to the first UWB positioning base station A at a moment t5, the first UWB positioning base station A receives the distance measurement data at a moment t6 and sends the confirmation signal at a moment t7, and the UWB positioning tag C receives the confirmation signal at a moment t8. In such case, it may be obtained that the time period required by the UWB positioning tag C between sending the distance measurement data and receiving the confirmation signal is T3=t8−t5 and the time period required by the first UWB positioning base station A between receiving the distance measurement data and sending of the confirmation signal is T4=t7−t6, and it may be obtained that time period for signal transmission during a two-way communication between the UWB positioning tag C and the first UWB positioning base station A is T3−T4=t8−t5−t7+t6. For ensuring the accuracy of the data, ¼ of (T1−T2+T3−T4) is determined as the time period for a signal transmission between the UWB positioning tag C and the first UWB positioning base station A. Since the transmission speed of the data signal is equal to the transmission speed c of the radio wave, and it may be obtained according to distance=speed*time period that the first distance between the UWB positioning tag and the first UWB positioning base station is R1=c*(T11−T12+T13−T14)/4. Similarly, it is obtained that the second distance between the UWB positioning tag and the second UWB positioning base station is R2, R2=c*(T21−T22+T23−T24)/4. A specific implementation manner is similar to the embodiment and will not be elaborated herein. According to the method of the embodiment for measuring the distance between the base station and the positioning tag, an average value of the data signal transmission time may be extracted to obtain more accurate transmission time period, so that a more accurate distance measurement result is obtained, a more reliable reference is provided for subsequently determining the position of the pet, and a better pet monitoring effect is ensured.

Figure 5:
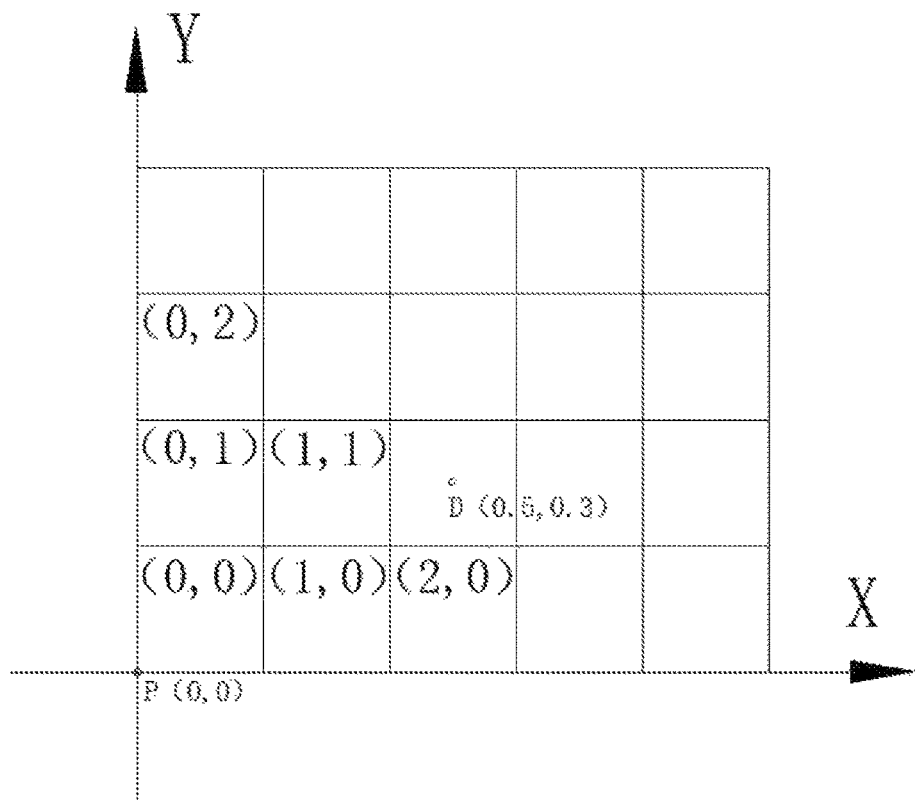
FIG. 5 is an analysis schematic diagram of converting a coordinate of a position point into a coordinate of a grid cell according to an exemplary embodiment of the present disclosure.

Optionally, the operation that the grid position corresponding to the pet in the grid map constructed by the robot is determined according to the mutual position relationship includes the following steps: the grid map according to an XY-axis coordinate system taking (X0, Y0) as an origin is constructed according to data detected by the robot in a walking process; it is determined that a side length of each grid cell in the grid map is L; according to own positioning data of the robot, it is determined that the coordinate of the present position point of the robot is (X1, Y1) and a grid coordinate of a grid cell corresponding to the present position point is (S11, S12), S11=(X1−X0)/L, S12=(Y1−Y0)/L and both S11 and S12 being integers; and according to the coordinate (X1, Y1) of the robot, it is determined that a grid coordinate corresponding to a position point of the pet is (S21, S22), S21=(X1+((W*cos α/2)+R2*cos(180°−α1−arccos(cos α))−X0)/L, S22=(Y1+((W*sin α)/2)+R1*cos (180°−α2−arcsin(cos α))−Y0)/L, and both S21 and S22 being integers. Since in the walking process, the robot may record a passed path based on the data detected by sensors, such as the odometer and the gyroscope, of the robot and determine the position and direction (i.e., the positioning data) of the robot in real time. The grid map is formed by taking grid cell as the basic unit, each grid cell includes multiple position points, and the robot walks according to the position points, namely moving from the present position point to a next adjacent position point. Therefore, when the coordinate of the grid cell where the robot is presently located is determined, it is necessary to convert the coordinate of the present position point into the coordinate of the grid cell. As shown in FIG. 5, each small check represents a grid cell, the side length is L=0.2 meters, a coordinate of the coordinate origin P is (X0=0, Y0=0), and a grid coordinate of a grid cell in the upper right corner of the origin P is set to be (0, 0). When the robot is at a position point D, the coordinate thereof is detected to be (0.5, 0.3), and the grid coordinate of the grid cell where the robot is located is calculated to be (S11=((0.5−)/0), S12=((0.3−0)/0.2)), i.e., (S11=2.5, S12=1.5), which is rounded to be (S11=2, S12=1), so that, when the robot is at the position point D, the grid coordinate of the corresponding grid cell is (2, 1). Similarly, after the coordinate of the present position point of the UWB positioning tag is determined to be (Xc, Yc), the grid coordinate (S21, S22) of the grid cell corresponding to the present position point of the UWB positioning tag is calculated, namely S21=(Xc−X0)/L and S22=(Yc−Y0)/L. The method is the same as the method for determining the grid coordinate of the robot and will not be elaborated herein. According to the method of the present disclosure, in the same coordinate system, the grid coordinate of the grid cell corresponding to the present position point may be accurately calculated through a position relationship between the present position point and the coordinate origin and the side length of the grid cell, thereby providing reliable data for subsequent data processing and improving the data analysis accuracy.

Figure 6:
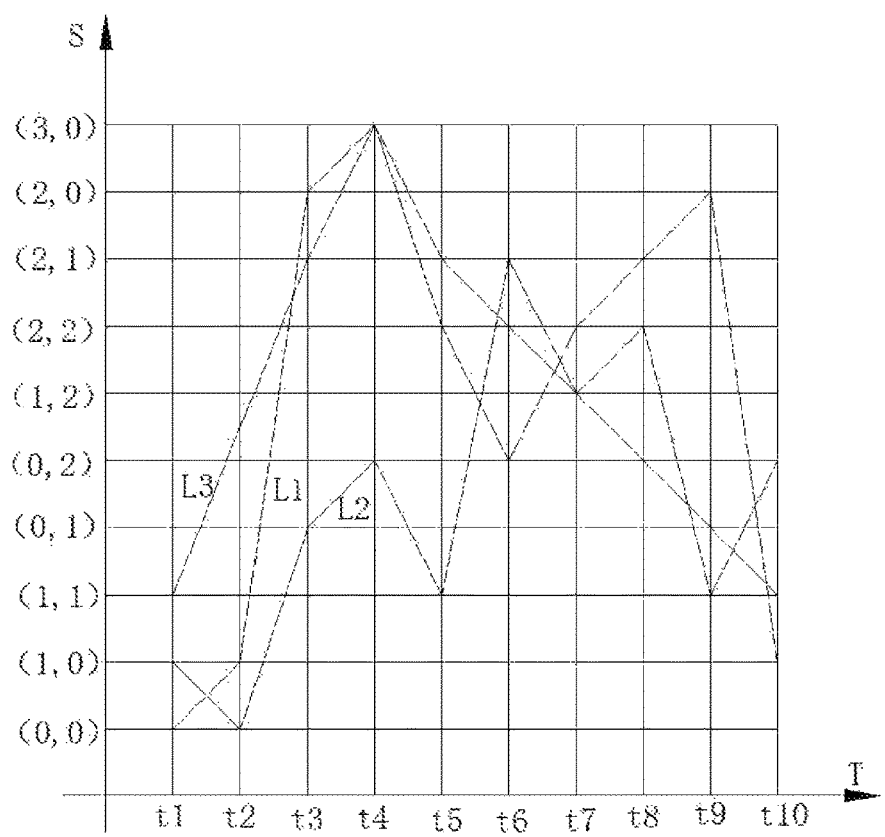
FIG. 6 is an analysis schematic diagram of a pet daily activity model according to an exemplary embodiment of the present disclosure.

Optionally, the operation that the grid positions of the pet at different time points are recorded, statistics on the recorded time information and corresponding grid position information is made and the pet daily activity model configured to predict the activity trajectory of the pet is constructed includes the following steps: the XY-axis coordinate system is constructed by taking a preset time interval as an X axis and taking a grid coordinate point as a Y axis; a grid coordinate point corresponding to a position point of the pet at the different time points on the Y axis is determined by taking the preset time interval as a time period from the origin along a time extension direction of the X axis in a first time period, and the determined grid coordinate points are sequentially connected to form a first activity trajectory; a grid coordinate point corresponding to a position point of the pet at the different time points on the Y axis is determined from the origin along the time extension direction of the X axis in a second time period, and the determined grid coordinate points are sequentially connected to form a second activity trajectory; a grid coordinate point corresponding to a position point of the pet at the different time points on the Y axis is determined from the origin along the time extension direction of the X axis in a third time period, and the determined grid coordinate points are sequentially connected to form a third activity trajectory; and an activity trajectory formed in each time period is continuously recorded in the same manner. The preset time interval is a value that may be set and may be set according to a time interval when a user intends to monitor the pet. For example, when the user intends to monitor the pet during working hours, the time interval may be set to be 8 AM to 6 PM, and a time period between 8 AM to 6 PM every day is a time period. Then, in a positive extension direction of the X axis, time points are determined at an interval of 1 second from 8:00:01, namely 8:00:02 is a next time point, 8:00:03 is a next time point of the next time point, and by parity of reasoning, recording of a time period is completed till 18:59:59. Next, recording of a second time period is completed from 8:00:01 to 18:59:59 in the next day. Later on, recording of a third time period is completed from 8:00:01 to 18:59:59 in the next day. By parity of reasoning, related grid coordinate data is continuously repeatedly recorded to provide data for subsequent big data analysis. Of course, the interval of 1 second for determination of the time points is only an example, the interval for determination of the time points may also be set to be 5 seconds, 10 seconds or 20 seconds according to a practical requirement, and when the set interval is shorter, the corresponding model is more accurate and an obtained prediction result is more accurate. Taking the grid coordinate point as the Y axis refers to taking a grid coordinate corresponding to a grid cell in the grid map as a Y-axis value, namely extension arrangement is implemented by taking a grid coordinate as a Y-axis point from the coordinate origin in a positive direction of the Y axis, and grid cells corresponding to adjacent Y-axis points are mutually adjacent grid cells. Of course, taking the grid coordinate point as the Y axis may also refer to taking a grid coordinate corresponding to a certain group of grid cells in the grid map as a Y-axis value, namely extension arrangement is implemented by taking a grid coordinate as a Y-axis point from the coordinate origin in the positive direction of the Y axis, a grid coordinate corresponds to a grid cell group and grid cell groups corresponding to adjacent Y-axis points are mutually adjacent grid cell groups. A grid cell group refers to a grid cell combination of a specified number of grid cells of which shapes are regular and the same. When the pet is in any grid cell in a grid cell group, it is indicated that the pet is at the grid coordinate corresponding to the grid cell group. For example, for a square grid cell group of which a side length is a length of three grid cells, a coordinate of the grid cell group including grid cells (0, 0), (1, 0), (2, 0), (0, 1), (1, 1), (2, 1), (0, 2), (1, 2) and (2, 2) is (SX0, SY0), and when the pet is in any one of the nine grid cells, it is considered that the pet is in the grid cell group and a corresponding grid coordinate point on the Y axis is (SX0, SY0). Since there are many grid cells, making statistics in form of these grid cell groups may reduce computations and improve the data processing speed and efficiency of the robot. As shown in FIG. 6, the figure is a schematic diagram of activities of the pet in a small range, little data is included in the figure for convenient description of the pet daily activity model of the embodiment, and a data size of the model in practical application is far larger than the data size in the figure. In FIG. 6, t1 to t10 on the X axis form a time period, moments t1, t2, t3, t4, t5, t6, t7, t8, t9 and t10 are recording time points respectively, (0, 0), (1, 0), (1, 1), (0, 1), (0, 2), (1, 2), (2, 2), (2, 1), (2, 0) and (3, 0) are grid coordinate points corresponding to grid coordinates on the Y axis, and the dotted line marked with L1 is an activity trajectory of the pet in a first time period. When recording is started from the moment t1, the pet is at a grid cell (0, 0) or a grid cell group (0, 0), the pet moves to a grid cell (1, 0) or a grid cell group (1, 0) at the moment t2, moves to a grid cell (2, 0) or a grid cell group (2, 0) at the moment t3, moves to a grid cell (3, 0) or a grid cell group (3, 0) at the moment t4, moves to a grid cell (2, 1) or a grid cell group (2, 1) at the moment t5, moves to a grid cell (2, 2) or a grid cell group (2, 2) at the moment t6, moves to a grid cell (1, 2) or a grid cell group (1, 2) at the moment t7, moves to a grid cell (0, 2) or a grid cell group (0, 2) at the moment t8, moves to a grid cell (0, 1) or a grid cell group (0, 1) at the moment t9 and moves to a grid cell (1, 1) or a grid cell group (1, 1) at the moment t10, and then these grid coordinate points are sequentially connected to form a first activity trajectory. Similarly, a second activity trajectory L2 is constructed, a third activity trajectory L3 is constructed, and an activity trajectory formed in each time period is continuously recorded in the same manner. If more activity trajectories are recorded, an output prediction result is more accurate.

Optionally, the operation that the pet is monitored according to the pet daily activity model includes the following steps: relatively dense activity trajectories are determined according to an activity trajectory distribution condition in the pet daily activity model; time points corresponding to the relatively dense activity trajectories is determined as predicted stay time points, and grid coordinates corresponding to the relatively dense activity trajectories are determined as predicted stay positions; whether a straight-line distance between the pet and the robot is longer than a preset distance or not is determined according to a present position of the robot and a present position of the pet; when the straight-line distance is not longer than the preset distance, a present tracking and monitoring state is kept; when the straight-line distance is longer than the preset distance, whether a time difference between a present time point and first predicted stay time point after the present time point is less than a set time period or not is determined; when the time difference is not less than the set time period, the present tracking and monitoring state is kept; when the time difference is less than the set time period, the predicted stay position corresponding to the first predicted stay time point after the present time point is determined, and a monitoring position point is determined according to the present position of the pet and the predicted stay position such that a shooting angle of a camera of the robot covers the present position of the pet and the predicted stay position when the robot is at the monitoring position point; and the robot is controlled to walk to the monitoring position point to monitor the pet. As shown in FIG. 6, the three activity trajectories in the figure are for conveniently describing formation of activity trajectories, and activity trajectories in practical application are huge in number and complex in shape. Activities of the pet are regular, to a certain extent, under the influence of the biological clock of the pet, so that there may also be certain change rules for a large number of activity trajectories formed in the model. There is made such a hypothesis that a large number of activity trajectories are at the point (0, 0) on the Y axis at the moment t1 and the activity trajectories at the point (0, 0) account for 80% of all activity trajectories at the moment t1. In such case, it may be determined that the activity trajectories corresponding to the point (0, 0) are relatively dense activity trajectories, the predicted stay time point corresponding to the relatively dense activity trajectories is t1, and a corresponding predicted stay position is the grid cell (0, 0) or the grid cell group (0, 0). When a geographical position corresponding to the grid cell (0, 0) or the grid cell group (0, 0) is house of the pet, it is indicated that the probability that the pet sleeps or plays in the house at every 8 AM reaches 80%, so that the robot monitors a direction of the house at the beginning, which may avoid a monitoring time delay brought by heavy early data computations and further improve the pet monitoring intelligence and efficiency of the robot. There is made another hypothesis that activity trajectories accounting for more than 70% of all activity trajectories are at the point (2, 2) on the Y axis during a time period between t5 and t8. In such case, it may be determined that the activity trajectories corresponding to the point (2, 2) are relatively dense activity trajectories, the predicted stay time period corresponding to the relatively dense activity trajectories is the a time period between t5 and t8, and a corresponding predicted stay position is the grid cell (2, 2) or the grid cell group (2, 2). When a geographical position corresponding to the grid cell (2, 2) or the grid cell group (2, 2) is a place where the pet urinates, it is indicated that the probability that the pet urinates in this place during the time is 70%, and in such case, whether to monitor the position point in advance or not may be comprehensively considered according to a position relationship between the robot and the pet before the moment t5. In addition, activity trajectories during the time period between t2 and t4 are relatively scattered and may not form relatively dense activity trajectories, so that predicted stay time and predicted stay positions may not be obtained. 80% and 70% may be modified to other numerical values specifically according to a design requirement of the product.

After the predicted stay time point and predicted stop position of the pet are determined according to the activity trajectory distribution condition in the pet daily activity model, the robot may determine the present position of the robot and the present position of the pet and determine whether the straight-line distance between the pet and the robot is longer than the preset distance or not. When the straight-line distance is not longer than the preset distance, it is indicated that the pet is still in a tracking and monitoring range of the robot, a monitoring manner is not required to be regulated and the present tracking and monitoring state is kept. When the straight-line distance between the pet and the robot is longer than the preset distance, it is indicated that the robot may not keep up with the pet for a reason such as an excessively high running speed, and the pet runs out of the tracking and monitoring range of the robot. In such case, it is necessary to further determine whether the time difference between the present time point and the first predicted stay time point after the present time point is less than the set time period or not. This is because immediately changing the monitoring manner according to a distance relationship between the robot and the pet is not the best solution, and when the predicted stay time point is reached in a very long time interval after the present time point, it is indicated that the pet runs randomly in this time interval, it is inappropriate to control the robot to pre-monitor the predicted stay position, and the tracking and monitoring state should be kept to avoid the condition that the pet may not be monitored for a long time and thus the monitoring effect is reduced. Therefore, when it is determined that the time difference between the present time point and the first predicted stay time point after the present time point is more than or equal to the set time period, it is necessary to timely track the pet and keep the present tracking and monitoring state. When it is determined that the time difference between the present time point and the first predicted stay time point after the present time point is less than the set time period, it is appropriate to control the robot to pre-monitor the predicted stay position. The preset distance may be set according to different design requirements of the product, may optionally be set to be any value from 3 to 8 meters, and may optimally be set to be 5 meters in the embodiment because the monitoring display effect may be relatively poor when the preset distance is set to be excessively long and. When the preset distance is set to be excessively short, the robot is required to frequently determine whether to switch the monitoring manner or not and the monitoring efficiency is reduced. The set time period may be set according to different design requirements of the product, may optionally be set to be any value from 10 to 50 seconds, and may optimally be set to be 20 seconds in the embodiment because an effect achieved by the robot in the pre-monitoring manner may be reduced when the set time period is set to be excessively short and when the set time is set to be excessively long, it is likely that the robot may not timely monitor the pet and thus the monitoring effect is reduced.

After it is determined that the straight-line distance between the pet and the robot is longer than the preset distance and the time difference between the present time point and the first predicted stay time point after the present time point is less than the set time period, namely after it is determined that it is appropriate to control the robot to pre-monitor the predicted stay position, it is necessary to further determine the predicted stay position corresponding to the first predicted stay time point after the present time point and determine the monitoring time point according to the present position of the pet and the predicted stay position such that the shooting angle of the camera of the robot may cover the present position of the pet and the predicted stay position when the robot is at the monitoring position point. Finally, the robot is controlled to walk to the monitoring position point to monitor the pet.

Figures 7, 8:
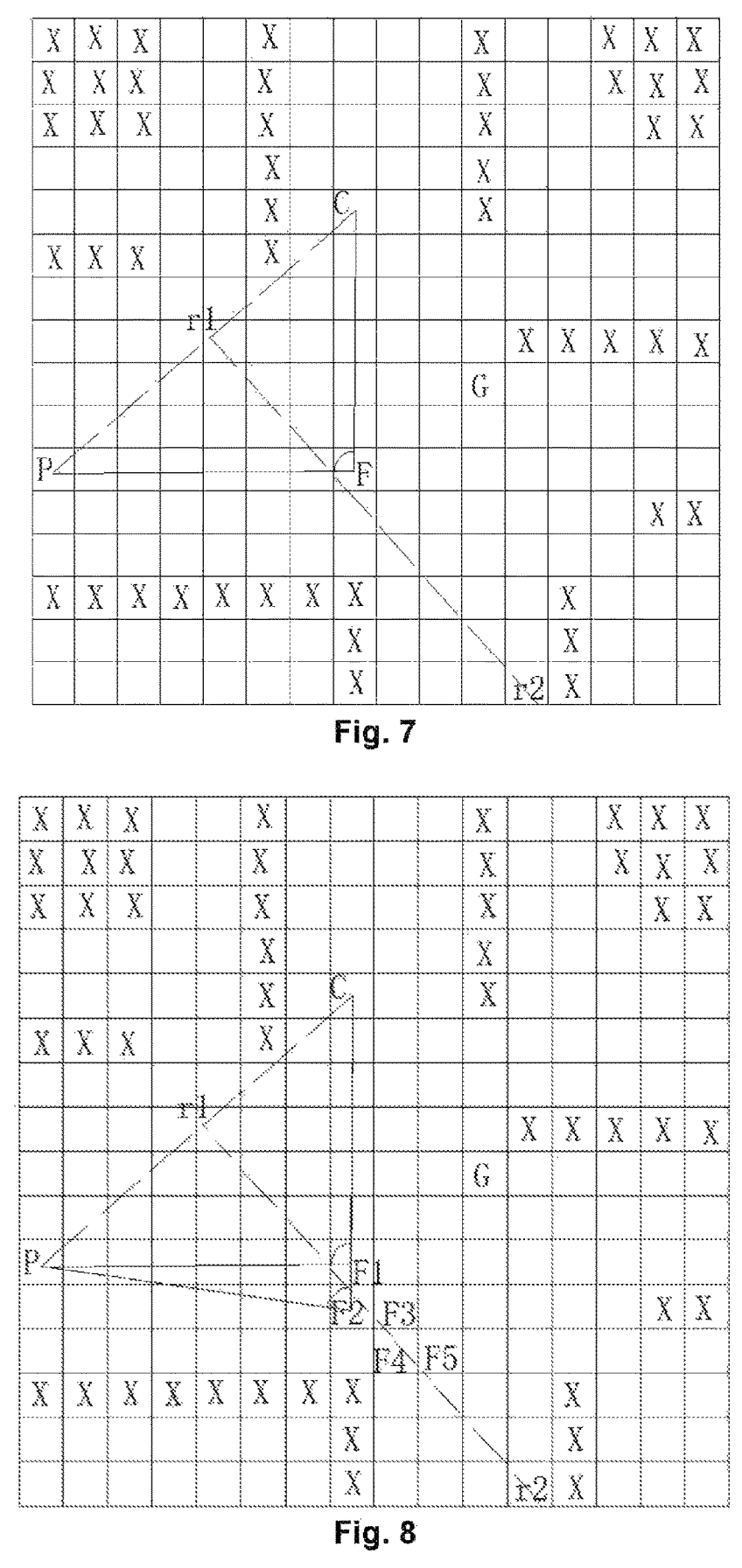
Figure 9:
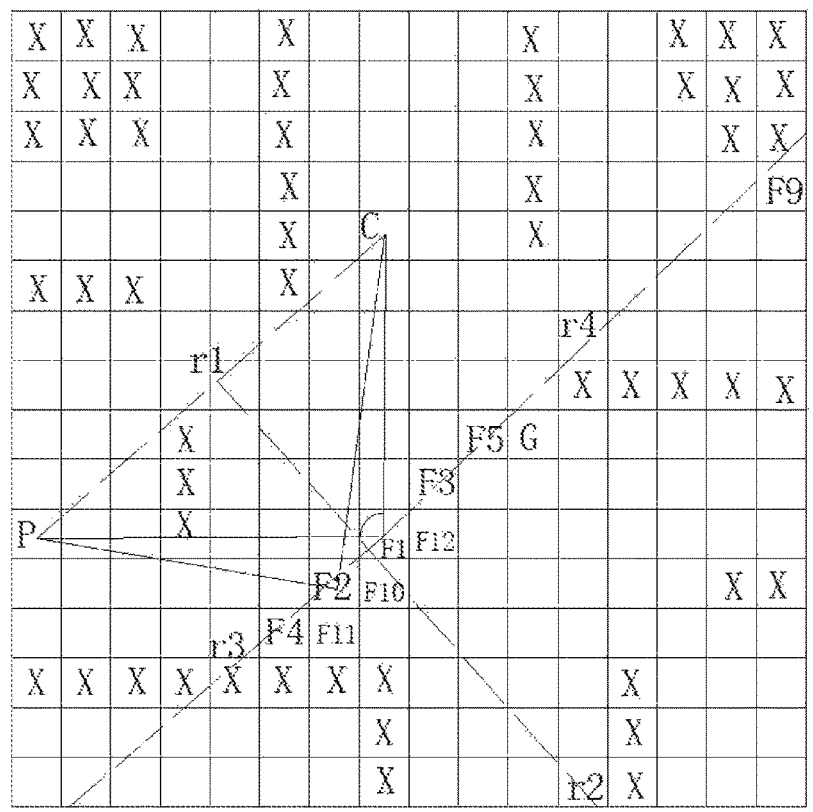
FIG. 9 is an analysis schematic diagram of determining a monitoring position point according to a present position of a pet and a predicted stay position according to a third exemplary embodiment of the present disclosure.

Optionally, the operation that the monitoring position point is determined according to the present position of the pet and the predicted stay position includes the following steps: Step 1: a grid cell corresponding to the present position of the pet is determined as a first cell, and a grid cell corresponding to the predicted stay position is determined as a second cell; Step 2: a passed cell closest to the robot on a perpendicular bisector of a connecting line of the first cell and the second cell is determined as a third cell; Step 3: whether an included angle between a connecting line from the first cell to the third cell and a connecting line from the second cell to the third cell is smaller than the shooting angle of the camera of the robot or not is determined; when the included angle is not smaller than the shooting angle, Step 4 is entered; Step 4: in an extension direction, far away from the first cell and the second cell, of the perpendicular bisector of the connecting line of the first cell and the second cell, passed cells arranged from short to long distances with the third cell are sequentially determined as new third cells, and Step 3 is re-executed; when the included angle is smaller than the shooting angle, Step 5 is entered; Step 5: whether there is an obstacle cell or not in a straight grid path from the third cell to the first cell and whether there is an obstacle cell or not in a straight grid path from the third cell to the second cell are determined; when there is none obstacle cell in the straight grid path from the third cell to the first cell and there is none obstacle cell in the straight grid path from the third cell to the second cell, Step 6 is entered; Step 6: a center point of a grid cell corresponding to the third cell is determined as the monitoring position point; when there is the obstacle cell in the straight grid path from the third cell to the first cell and/or there is the obstacle cell in the straight grid path from the third cell to the second cell, Step 7 is entered; Step 7: in an extension direction of a parallel line passing through the third cell and parallel to the connecting line of the first cell and the second cell, passed cells that the parallel line passes through are sequentially determined as new third cells, and whether the new third cell is a passed cell closest to a boundary of the grid map or not is determined; when the new third cell is not the passed cell closest to the boundary of the grid map, Step 5 is re-executed; and when the new third cell is the passed cell closest to the boundary of the grid map, passed cells arranged from short to long distances with the passed cell closest to the robot on the perpendicular bisector of the connecting line of the first cell and the second cell are sequentially determined as new third cells, and Step 5 is re-executed. As shown in FIGS. 7, 8 and 9, the check marked with X represents an obstacle cell and the other checks represent passed cells. As shown in FIG. 7, at first, the grid cell corresponding to the present position of the pet is determined as the first cell (the grid cell marked with C in the figure) through the method of the abovementioned embodiment, and the grid cell corresponding to the predicted stay position is determined as the second cell (the grid cell marked with P in the figure) through the method of the abovementioned embodiment. Then, the passed cell closest to the robot on the perpendicular bisector r1r2 of the connecting line CP of the first cell and the second cell is determined as the third cell (the grid cell marked with F1 in the figure). Next, whether the included angle ∠CF1P between the connecting line CF1 from the first cell to the third cell and the connecting line PF1 from the second cell to the third cell is smaller than the shooting angle of the camera of the robot or not is determined. When ∠CF1P is smaller than the shooting angle, it is indicated that a shooting region of the camera of the robot at the position F1 may completely cover the present position of the pet and the predicted stay position. In such case, as shown in FIG. 7, there is no obstacle cell in the straight grid path from the third cell to the first cell (i.e., a grid path formed by grid cells that the straight line CF1 passes through) and there is also no obstacle cell in the straight grid path from the third cell to the second cell (i.e., a grid path formed by grid cells that the straight line PF1 passes through), so that the robot at the position F1 may effectively monitor the pet at the position C and the pet that may run to the position P later. And meanwhile, when the pet runs from the position C to the position P, there is also a relatively high probability that a running path thereof appears in a shooting range of the camera at the position F1. Therefore, determining the center point of the grid cell corresponding to the position F1 determined in this manner as the monitoring position point may monitor the pet more intelligently and achieve a better monitoring effect. When ∠CF1P is more than or equal to the shooting angle, it is indicated that the shooting region of the camera of the robot at the position F1 may not completely cover the present position of the pet and the predicted stay position. In such case, it is necessary to re-determine a position of the third cell. As shown in FIG. 8, the passed cell closest to the third cell is determined as a new third cell (the grid cell marked with F2 in the figure) in the extension direction, far away from the first cell and the second cell, of the perpendicular bisector of the connecting line of the first cell and the second cell, then whether ∠CF1P is smaller than the shooting angle or not is determined, when ∠CF1P is not smaller than the shooting angle, the passed cell that is the second closest to the third cell is continued to be determined as a new third cell (the grid cell marked with F3 in the figure) in the outward extension direction of the perpendicular bisector, whether ∠CF1P is smaller than the shooting angle or not is determined, and when ∠CF1P is not smaller than the shooting angle, a next new third cell (F4, F5 and the like) is continued to be analyzed in the same manner until an angle corresponding to a determined new third cell is smaller than the shooting angle. After a proper third cell on the perpendicular bisector is determined, it is necessary to further determine whether there is an obstacle cell or not on the straight grid path from the third cell to the first cell and whether there is an obstacle cell or not on the straight grid path from the third cell to the second cell, and when there is no obstacle cell on both the straight grid paths, the center point of the grid cell corresponding to the third cell is directly determined as the monitoring position point. When there is the obstacle cell on the straight grid path and/or there is the obstacle cell on the straight grid path, it is indicated that, when the robot shoots the position C and/or the position P from the present position, the pet may be occluded by an obstacle and may not be monitored well, so that the position of the third cell is required to be regulated. As shown in FIG. 9, ∠CF1P is smaller than the shooting angle and there is an obstacle cell in the straight grid path from the third cell to the second cell (i.e., a grid path formed by grid cells that the straight line F1P passes through). For achieving a better monitoring effect, the passed cell closest to the third cell in a direction far away from the third cell along the extension direction of the parallel line r3r4 passing through the third cell and parallel to the connecting line of the first cell and the second cell is determined as a new third cell (if there are passed cells of which the distances are shortest and the same, one of them is randomly selected, and the grid cell marked with F2 in the figure is selected in the embodiment). And in such case, it is determined that there is no obstacle cell in the straight grid path F2P and the straight grid path F2C and the center point of the grid cell corresponding to F2 may be determined as the monitoring position point. In such a manner of re-determining the third cell along the extension direction of the parallel line r3r4 parallel to the line r1r2, it may be ensured that the angle corresponding to the re-determined third cell is always smaller than the shooting angle and an optimal position may be rapidly found in order. When there is still an obstacle cell in the straight grid path F2P at the position F2, F3, F4, F5 and the like are sequentially determined as new third cells in the same manner till the grid cell corresponding to F9, and since F9 is a passed cell closest to the boundary of the grid map, it is necessary to determine the passed cells (i.e., the grid cell marked with F10 in the figure) arranged from short to long distances with the passed cell closest to the robot on the perpendicular bisector r1r2 of the connecting line of the first cell and the second cell as new third cells. When there is still an obstacle cell in the straight grid path F10P or F10C, the passed cells such as F11 and F12 are sequentially determined as new third cells in the extension direction of the parallel line passing through F10 and parallel to the line r1r2, related analysis and determination are continued according to the same manner, and when there is no obstacle cell in straight grid paths from a finally determined third cell to the first cell and the second cell respectively, the center point of the grid cell corresponding to the third cell is determined as the monitoring position point. When the proper third cell may not be found after all the related grid cells in the direction of the perpendicular bisector and the direction of the parallel direction are analyzed according to the abovementioned method, the flow is ended, and the robot continues monitoring according to the original tracking and monitoring state, and when the position of the pet changes, immediately starts a new round of analysis. Through the method of searching the position where the present position of the pet and the predicted stay position may be simultaneously monitored, the optimal position point may be determined rapidly and accurately, and the determined optimal position point is a position point relatively closest to the present position of the robot and reached by the robot most conveniently, so that the pet monitoring efficiency and effect of the robot are greatly improved.

Optionally, the relatively dense activity trajectories are activity trajectories in the same grid coordinate range in a certain time interval, and a ratio of the number of the relatively dense activity trajectories to the number of all activity trajectories in the same time interval is greater than a preset numerical value. The preset numerical value may be set according to a specific design requirement. The preset numerical value is optionally greater than 70%, and is optimally set to be 80% or 90%, so that the accuracy of the prediction result output according to the model may be ensured, and the pet monitoring efficiency and effect of the robot may be improved.

Optionally, the operation that the present tracking and monitoring state is kept includes the following steps: whether a distance between the robot and the pet is less than or equal to a set distance or not is determined; when the distance is not less than or equal to the set distance, the monitoring position point is re-determined, and the robot is controlled to walk to the monitoring position point to monitor the pet; when the distance is less than or equal to the set distance, whether there is an obstacle cell or not in grid cells in a preset range covered by a shooting angle of a camera through which the robot monitors the pet between a grid cell where the robot is located and a grid cell where the pet is located is determined; when there is none obstacle cell in grid cells in the preset range, the camera of the robot is kept facing a shooting direction of the pet; and when there is the obstacle cell in grid cells in the preset range, the monitoring position point is re-determined, and the robot is controlled to walk to the monitoring position point to monitor the pet. When the robot monitors the pet in the tracking and monitoring state, it is necessary to keep a certain distance with the pet, and when the distance is too long, a shot pet image is not clear, a present state of the pet may not be seen clearly and the tracking and monitoring effect may not be achieved. Therefore, when the pet is tracked and monitored, it is necessary to determine the distance between the robot and the pet, and when the distance between the robot and the pet is longer than the set distance, it is necessary to re-determine the monitoring position point to find an optimal position for monitoring the pet. When the distance between the robot and the pet is less than or equal to the set distance, the pet may be monitored in this range. In such case, it is necessary to further determine whether there is an obstacle cell or not in the grid cells in the preset range covered by the shooting angle of the camera through which the robot monitors the pet between the grid cell where the robot is located and the grid cell where the pet is located. When there is none obstacle cell in the grid cells, it is indicated that the camera of the robot may normally shoot the pet and the present camera is kept facing the shooting direction of the pet. When there is the obstacle cell in the grid cells, it is necessary to re-determine the monitoring position point. The set distance may be set according to a practical design requirement, may be set to be any value in a range of 2 to 5 meters, and is optimally set to be 3 meters. The preset range may also be set according to different design requirements of the product, and is optionally set to be ⅓ of the whole range covered by the shooting angle of the camera. The tracking and monitoring state of the monitoring position point is continuously regulated according to a change of the distance between the robot and the pet and an occlusion condition of the obstacle, so that the pet monitoring effect of the robot may be ensured.

Figure 10:
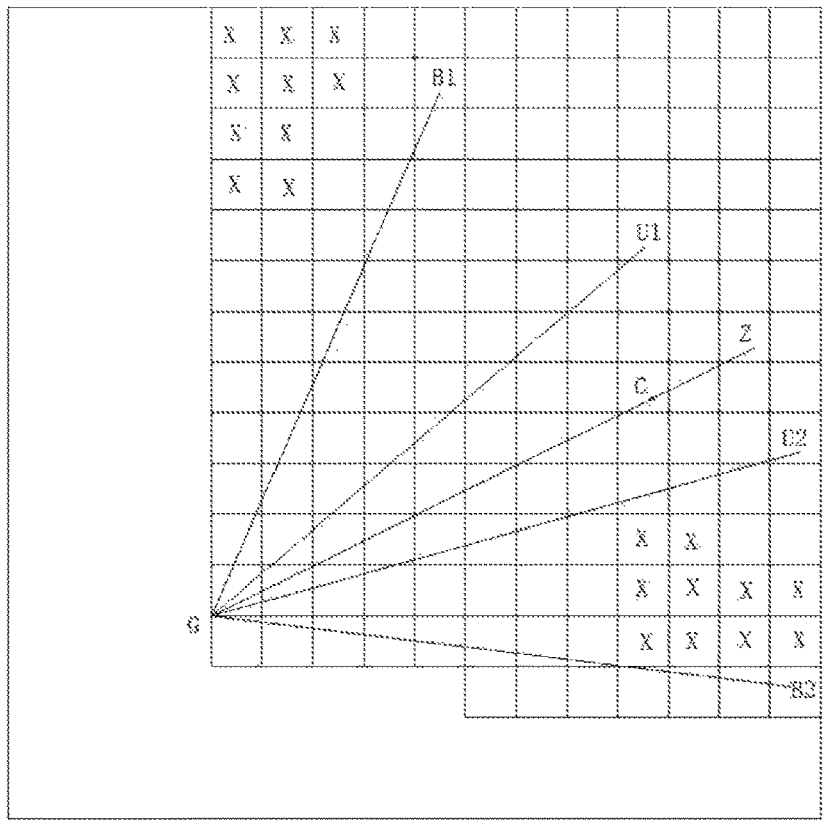
FIG. 10 is an analysis schematic diagram of determining a grid region shot by a robot according to an exemplary embodiment of the present disclosure.

Optionally, the operation that whether there is an obstacle cell or not in the grid cells in the preset range covered by the shooting angle of the camera through which the robot monitors the pet between the grid cell where the robot is located and the grid cell where the pet is located is determined includes the following steps: a direction that the camera through which the robot monitors the pet faces the pet is determined as the shooting direction; a shooting region covered by the shooting angle of the camera in the grid map is determined according to the shooting direction; and grid cells corresponding to a coverage region of an angle range formed by a first angle arm and second angle arm extending outwards by taking the camera as an angular vertex in the grid map are determined, and whether there is an obstacle cell or not in the grid cells corresponding to the coverage region is analyzed, the coverage region being smaller than and in the shooting region. As shown in FIG. 10, a small check in the figure represents a grid cell, the check marked with X represents that the check is an obstacle cell, and the check marked with nothing or marked with another letter represents that the check is a passed cell. The point G is the position point where the robot is located, i.e., the position of the camera, and the point C is the position point where the pet is located. GZ is the shooting direction, an angle formed by the two lines GB1 and GB2 is the shooting angle, and GZ is an angle bisector of the shooting angle. GU1 is the first angle arm, GU2 is the second angle arm, whether there is an obstacle cell or not in grid cells in the angle formed by the two lines GU1 and GU2 is analyzed, namely whether there is a check marked with X or not in checks in a range of ∠U1GU2 is determined. When there is the check marked with X, it is indicated that there is an obstacle cell, and when there is none check marked with X, it is indicated that there is no obstacle cell. In the figure, there is no obstacle cell in the range of ∠U1GU2, and the robot may normally shoot the pet. When there is an X check in the range of ∠U1GU2, it is indicated that the camera of the robot may be obstructed by an obstacle or the shot pet is too close to the obstacle and the shooting effect is influenced, and it is necessary to shoot the pet at another angle. According to the method of the embodiment, whether there is an obstacle cell between two position points or not is determined in combination with the grid map to determine whether there is an obstacle between the robot and the pet or not, and in such a manner, existing data of the robot is fully utilized, a determination process is simple and practical, and a remarkable effect is achieved.

Optionally, the operation that the monitoring position point is re-determined includes the following steps: a preset region taking the grid cell where the pet is located as a center point is determined, passed cells are determined as undetermined monitoring cells one by one from short to long distance relationships between the passed cells in the preset region and the robot, and whether there is an obstacle cell or not in a straight grid path between the undetermined monitoring cell and the grid cell where the pet is located is determined; when there is none obstacle cell in the straight grid path, the undetermined monitoring cell is determined as a monitoring cell, and a center point of the monitoring cell is determined as the monitoring position point; when there is the obstacle cell in the straight grid path, whether the next passed cell is farthest from the robot or not is determined; when the next passed cell is farthest from the robot, the next passed cell is directly determined as a monitoring cell, and a center point of the monitoring cell is determined as the monitoring position point; and when the next passed cell is not farthest from the robot, the next passed cell is determined as an undetermined monitoring cell, and the step that whether there is an obstacle cell or not in the straight grid path between the undetermined monitoring cell and the grid cell where the pet is located is determined is continued, the obstacle cell being a corresponding grid cell when the robot detects an obstacle and the passed cell being a grid cell that the robot has passed. The preset range may also be set according to different design requirements of the product, and may optionally be set to be a circular region, a square region, a regular polygonal region or the like, and an area is usually set in a range of 2 to 6 square meters.

The passed cells in the preset region around the pet are selected from short to long distance relationships with the robot and determined as monitoring cells to be determined one by one, then whether there is an obstacle cell or not in the straight grid path between the monitoring cell to be determined and the grid cell where the pet is located is determined, namely whether the pet may be effectively monitored or not at a position of the monitoring cell to be determined is analyzed. When there is no obstacle, the monitoring cell to be determined is determined as the monitoring cell, and if there is an obstacle, the next passed cell is analyzed. In such a manner of analyzing the passed cells in the preset region around the pet one by one from short to long distances away from the robots, a position point that the robot may reach fastest and where the pet may be effectively monitored may be found, so that efficiency of monitoring the pet by the robot is improved. In addition, when there are obstacles between all the other passed cells, except the passed cell farthest from the robot, in the preset region and the pet, the passed cell farthest from the robot is determined as the monitoring cell no matter whether there is an obstacle between the robot and the pet or not, and this is because distribution of obstacles has a characteristic under a normal condition, namely the obstacles may usually be concentrated in one region or some regions, when an obstacle cell is detected in a region, there may be other obstacle cells in the region, and when the past robot detects an obstacle at the present position, in a certain range, the probability of occurrence of an obstacle is lower in a region farther from the present position. Therefore, determining the passed cell farthest from the robot in the preset range as the monitoring cell may ensure that the robot is in a relatively open region and, when the position of the pet changes, the monitoring position or monitoring angle may be conveniently regulated at a low probability of interference of an adjacent obstacle, which improves the monitoring efficiency. From the above, according to the method of the embodiment, the robot may be controlled to find a relatively good monitoring position in such a manner of monitoring the pet in combination with the grid map, so that the problem that the pet is easily obstructed by an obstacle to influence the monitoring effect is solved, and the pet monitoring effect is improved.

Figure 11:
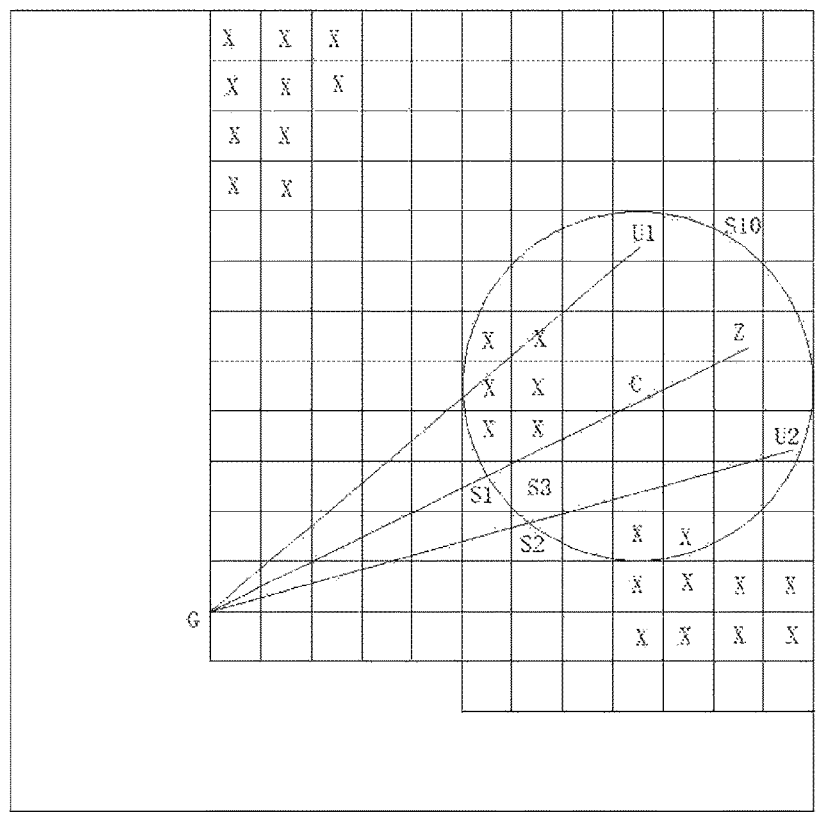
FIG. 11 is an analysis schematic diagram of determining a monitoring cell according to an exemplary embodiment of the present disclosure.

In addition, the operation that the preset region taking the grid cell where the pet is located as the center point is determined and the passed cells are determined as the monitoring cells to be determined one by one from short to long distance relationships between the passed cells in the preset region and the robot includes the following steps: a circular region taking a center of the grid cell where the pet is located as a circle center and taking a preset length as a radius is determined; a passed cell at a shortest distance away from the robot in the circular region is determined as a monitoring cell to be determined; when there is an obstacle cell in a straight grid path between the monitoring cell to be determined and the grid cell where the pet is located and a passed cell at a second shortest distance away from the robot in the circular region is not farthest from the robot, the passed cell at the second shortest distance away from the robot in the circular region is determined as a monitoring cell to be determined; when there is an obstacle cell in a straight grid path between the monitoring cell to be determined and the grid cell where the pet is located and a passed cell at a third shortest distance away from the robot in the circular region is not farthest from the robot, the passed cell at the third shortest distance away from the robot in the circular region is determined as a monitoring cell to be determined; and the same operations are executed. As shown in FIG. 11, a small check in the figure represents a grid cell, the check marked with X represents that the check is an obstacle cell, and the check marked with nothing or marked with another letter represents that the check is a passed cell. The point G is the position point where the robot is located, i.e., the position of the camera, and the point C is the position point where the pet is located. GZ is the shooting direction, GU1 is the first angle arm, and GU2 is the second angle arm. Since there is an obstacle cell (i.e., a check marked with X) in the range of ∠U1GU2 and shooting of the robot may be obstructed by the obstacle, the robot is required to regulate a shooting position. At first, a circle is formed by taking the center of the grid cell where the point C is located as a circle center and taking the preset length as a radius, and the range enclosed by the circle is the preset region. The preset length may be set according to a specific design requirement, may optionally be set to be any value in a range of 1 to 2 meters, and is set to be 1.5 meters in the embodiment. It is to be noted that the circular region shown in FIG. 7 is schematic and the radius or diameter of the circle may not be measured by the length of the grid cell in the figure. In addition, when the circle region encloses part of a grid cell, the grid cell is also in the range of the circular region. In the figure, the grid cell S1 is a passed cell at a shortest distance away from the robot in the circular region and is determined as a monitoring cell to be determined. Since there is an obstacle cell marked with X in the straight grid path between S1 and C (i.e., a path formed by grid cells that a straight line connecting S1 and C passes through), S1 may not be determined as the monitoring cell. Then, the passed cell S2 at the second shortest distance away from the robot is analyzed. Since S2 is not a passed cell farthest from the robot in the circular region, the passed cell S2 at the second shortest distance away from the robot is determined as a monitoring cell to be determined. Since there is no obstacle cell marked with X in the straight grid path between S2 and C, namely there is no obstacle obstructing the robot from shooting the pet, S2 is determined as the monitoring cell, and the robot is navigated to the passed cell S2 to monitor the pet. When there is also an obstacle cell in the straight grid path between S2 and C, the passed cell S3 at the third shortest distance away from the robot is continued to be analyzed, and a method is the same as the abovementioned method and will not be elaborated. When there are obstacle cells in straight grid paths between all the passed cells, except S10, in the circular region and the robot, it is indicated that the pet is at a position surrounded by obstacles (for example, on a sofa, a tea table or a bed), and in such case, the obstacle cells between the passed cells and the pet are not required to be considered in the preset region and a position point relatively far from the position of the pet and far from the present position of the robot is required to be considered, so that the passed cell S10 farthest from the robot may be directly determined as the monitoring cell and the robot is navigated to the monitoring cell to monitor the pet. In such a manner of analyzing the passed cells in the preset region around the pet one by one from short to long distances away from the robots, a position point that the robot may reach fastest and where the pet may be effectively monitored may be found, so that efficiency of monitoring the pet by the robot is improved.

Figure 12:
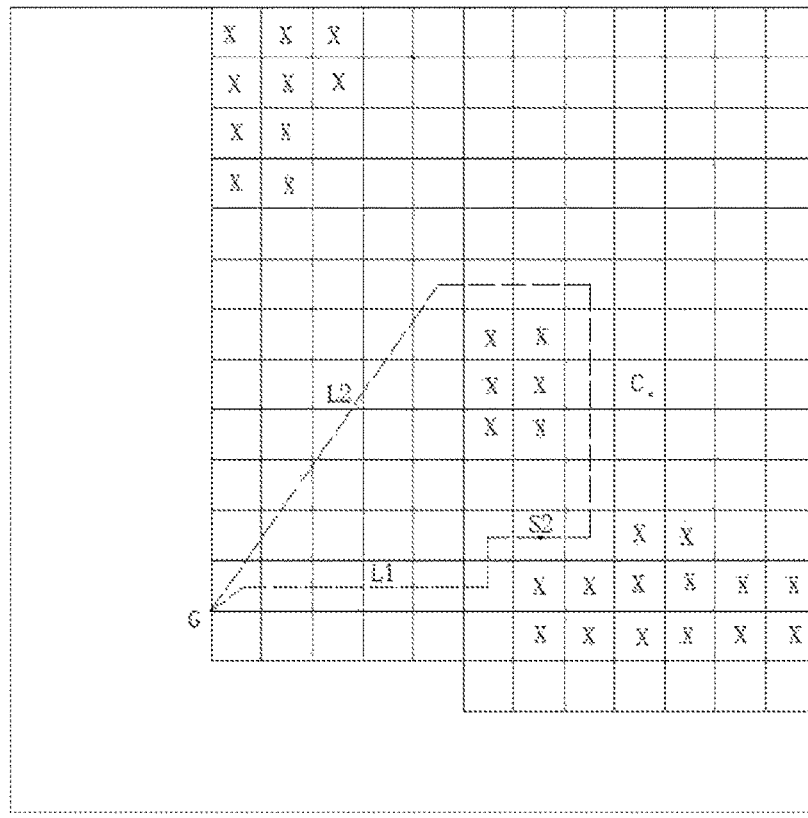
FIG. 12 is an analysis schematic diagram of determining a navigation path of a robot from a present position point to a monitoring position point according to an exemplary embodiment of the present disclosure.

Optionally, the operation that the robot is controlled to walk to the monitoring position point to monitor the pet includes the following steps: the grid map is searched by taking the present position point of the robot as a starting point and taking a direction pointed from the present position point to the monitoring cell as a searching direction; a grid path with a smallest path length in grid paths directly connected by passed cells between the present position point of the robot and the center point of the monitoring cell is determined as a navigation grid path; center points of grid cells in the navigation grid path are determined as navigation position points, and the navigation position points are connected into a navigation path; the robot is controlled to walk along the navigation path from the present position point to the monitoring position point; and a direction of the robot is regulated to ensure that the shooting direction of the camera of the robot points to a direction of the pet. As shown in FIG. 12, when the robot is intended to walk from the point G to the monitoring cell S2, it is necessary to search a walking path at first. In the figure, a small check in the figure represents a grid cell, the check marked with X represents that the check is an obstacle cell, and the check marked with nothing or marked with another letter represents that the check is a passed cell. At first, the grid map is searched from the starting point that is the present position point G of the robot to the direction of the monitoring cell. Searching to the direction of the monitoring cell is not limited to searching to a linear direction of the monitoring cell and refers to searching the grid cells one by one from the point G to directions away from the point G around by taking the direction as a general searching trend and searching the grid cells one by one from the surrounding to the monitoring cell. Then, two grid paths are found, the first connecting the left lower part of the monitoring cell and the monitoring cell and the second connecting the right upper part of the monitoring cell and the monitoring cell, and the two grid paths are separated by an obstacle cell. A length of the first grid path is less than that of the second grid path, so that the first grid path is determined as a navigation grid path. Center points of the grid cells in the first grid path are determined as navigation position points, and the navigation position points are connected into a navigation path, i.e., the dotted line marked as L1 (the dotted line marked as L2 is a route of the second grid path). Next, the robot is controlled to walk along the route L1 from the point G to the center point of the monitoring cell S2 (i.e., the monitoring position point). Finally, the body of the robot rotates in place to ensure that the shooting direction of the camera of the robot is a direction facing the point C (i.e., the direction of the pet). According to the method of the embodiment, the grid map is searched to the direction of the monitoring cell, so that the specific grid paths reaching the monitoring cell may be determined rapidly. Then, a length of each path is analyzed to determine the shortest path as the navigation path, so that time required by the robot to reach the monitoring cell may be shortened. Finally, the center points of the grid cells are determined as the navigation position points, the navigation path formed by connecting each navigation position point is the best navigation path reaching the monitoring position point, and the robot walks along the navigation path, so that not only may time for reaching the destination be shortened, but also the risk of encountering an obstacle in the walking process may be reduced, and the efficiency of reaching the monitoring position point for the robot may be improved. Optionally, the side length of the grid cell shown in the figure of the embodiment is equal to a diameter of the body of the robot.

In addition, the present disclosure also provides a chip, configured to store a program, the program being configured to control a robot to execute the intelligent pet monitoring method for the robot. The chip is installed on a body of the robot such that the robot may determine a mutual position relationship between a pet and the robot through wireless communication between the wireless signal device on the pet and the robot and then determine a grid position corresponding to the pet in a grid map constructed by the robot according to the mutual position relationship. Daily activities of the pet may also be regular, to a certain extent, under the influence of a biological clock of the pet, so that big data generated by the grid positions of the pet at different time points is finally recorded to construct the pet daily activity model, and the daily activity trajectory of the pet may be predicted according to the model. Therefore, a relatively good monitoring position and monitoring angle may be intelligently selected, the problems of poor monitoring efficiency and effect caused by the condition that an existing robot runs after a pet are solved, and the pet monitoring efficiency and effect of the robot are improved.

The above embodiments are adopted not to limit but to fully disclose the present disclosure and all replacements made with equivalent technical characteristics according to the creative gist of the present disclosure without creative work shall fall within the scope disclosed by the application.

What is claimed is:

1. An intelligent pet monitoring method for a robot, comprising the following steps:
   determining a mutual position relationship between a pet and the robot according to wireless communication between the robot and a wireless signal device on the pet;
   determining a grid position corresponding to the pet in a grid map constructed by the robot according to the mutual position relationship;
   recording grid positions of the pet at different time points, making statistics on recorded time information and corresponding grid position information, and constructing a pet daily activity model configured to predict an activity trajectory of the pet; and
   monitoring the pet according to the pet daily activity model.

2. The method as claimed in claim 1, wherein determining the mutual position relationship between the pet and the robot according to the wireless communication between the robot and the wireless signal device on the pet comprises the following steps:
   determining that a distance between a first Ultra Wideband (UWB) positioning base station and a second UWB positioning base station on a body of the robot is W;
   determining that a coordinate of the first UWB positioning base station is (X11, Y11) and a coordinate of the second UWB positioning base station is (X12, Y12);
   according to wireless communication between each of the first UWB positioning base station and the second UWB positioning base station and a UWB positioning tag on the pet, determining that a first distance between the UWB positioning tag and the first UWB positioning base station is R1 and a second distance between the UWB positioning tag and the second UWB positioning base station is R2;
   determining that an included angle between lines taking the first UWB positioning base station as an angular vertex and pointing to the second UWB positioning base station and the UWB positioning tag respectively is a first included angle, the first included angle being $\alpha 1$ and $\alpha 1 = \arccos((W^2 + R2^2 - R1^2)/(2*W*R2))$;
   determining that an included angle between lines taking the second UWB positioning base station as an angular vertex and pointing to the first UWB positioning base station and the UWB positioning tag respectively is a second included angle, the second included angle being $\alpha 2$ and $\alpha 2 = \arccos((W^2 + R1^2 - R2^2)/(2*W*R1))$; and
   determining that a coordinate of a present position point of the UWB positioning tag is (Xc, Yc), $Xc = X12 + R2*\cos(180° - \alpha 1 - \arccos((X12 - X11)/W))$ and $Yc = Y11 + R1*\cos(180° - \alpha 2 - \arcsin((X12 - X11)/W))$.

3. The method as claimed in claim 2, wherein determining that the coordinate of the first UWB positioning base station is (X11, Y11) and the coordinate of the second UWB positioning base station is (X12, Y12) comprises the following steps:
   determining a coordinate of a center point of the body of the robot as a coordinate of a present position point of the robot, the coordinate being (X1, Y1);
   determining that the center point of the body of the robot is at a midpoint of a connecting line of the first UWB positioning base station and the second UWB positioning base station;
   determining that the distance between the first UWB positioning base station and the second UWB positioning base station is W, a distance between the center point of the body of the robot and the first UWB positioning base station is W/2 and a distance between the center point of the body of the robot and the second UWB positioning base station is W/2;
   determining that a present direction, detected by a gyroscope of the robot, of the robot is $\alpha$;
   determining that the coordinate of the first UWB positioning base station on the body of the robot is (X11, Y11), $X11 = X1 - ((W*\cos \alpha)/2)$ and $Y11 = Y1 + ((W*\sin \alpha)/2)$; and
   determining that the coordinate of the second UWB positioning base station on the body of the robot is (X12, Y12), $X12 = X1 + ((W*\cos \alpha)/2)$ and $Y12 = Y1 - ((W*\sin \alpha)/2)$.

4. The method as claimed in claim 2, wherein determining, according to the wireless communication between each of the first UWB positioning base station and the second UWB positioning base station and the UWB positioning tag on the pet, that the first distance between the UWB positioning tag and the first UWB positioning base station is R1 and the second distance between the UWB positioning tag and the second UWB positioning base station is R2 comprises the following steps:

determining that a propagation speed of a radio wave is c;

determining that a time period between sending distance measurement data from the first UWB positioning base station to the UWB positioning tag and receiving a confirmation signal from the UWB positioning tag is T11;

determining that a time period between receiving the distance measurement data sent from the first UWB positioning base station to the UWB positioning tag and sending the confirmation signal from to the UWB positioning tag is T12;

determining that a time period between sending distance measurement data from the UWB positioning tag to the first UWB positioning base station and receiving a confirmation signal from the first UWB positioning base station is T13;

determining that a time period between receiving the distance measurement data sent from the UWB positioning tag to the first UWB positioning base station and sending the confirmation signal from the first UWB positioning base station is T14;

determining that the first distance between the UWB positioning tag and the first UWB positioning base station is R1, R1=c*(T11−T12+T13−T14)/4;

determining that a time period between sending distance measurement data from the second UWB positioning base station to the UWB positioning tag and receiving a confirmation signal from the UWB positioning tag is T21;

determining that a time period between receiving the distance measurement data sent from the second UWB positioning base station to the UWB positioning tag and sending the confirmation signal from the UWB positioning tag is T22;

determining that a time period between sending distance measurement data from the UWB positioning tag to the second UWB positioning base station and receiving a confirmation signal from the second UWB positioning base station is T23;

determining that a time period between receiving the distance measurement data sent from the UWB positioning tag to the second UWB positioning base station and sending the confirmation signal from the second UWB positioning base station is T24; and determining that the second distance between the UWB positioning tag and the second UWB positioning base station is R2, R2=c*(T21−T22+T23−T24)/4.

5. The method as claimed in claim 3, wherein determining the grid position corresponding to the pet in the grid map constructed by the robot according to the mutual position relationship comprises the following steps:

constructing the grid map based on an XY-axis coordinate system taking (X0, Y0) as an origin according to data detected by the robot in a walking process;

determining that a side length of each grid cell in the grid map is L;

according to positioning data of the robot, determining that the coordinate of the present position point of the robot is (X1, Y1) and a grid coordinate of a grid cell corresponding to the present position point is (S11, S12), S11=(X1−X0)/L, S12=(Y1−Y0)/L and both S11 and S12 being integers; and according to the coordinate (X1, Y1) of the robot, determining that a grid coordinate corresponding to a position point of the pet is (S21, S22), S21=(X1+((W*cos α/2)+R2*cos(180°−α1−arccos(cos α))−X0)/L, S22=(Y1+((W*sin α)/2)+R1*cos(180°−α2−arcsin(cos α))−Y0)/L, and both S21 and S22 being integers.

6. The method as claimed in claim 1, wherein recording the grid positions of the pet at different time points, making statistics on the recorded time information and corresponding grid position information and constructing the pet daily activity model configured to predict the activity trajectory of the pet comprises the following steps:

constructing the XY-axis coordinate system by taking a preset time interval as an X axis and taking a grid coordinate point as a Y axis;

determining a grid coordinate point corresponding to a position point of the pet at the different time points on the Y axis by taking the preset time interval as a time period from the origin along a time extension direction of the X axis in a first time period, and sequentially connecting the determined grid coordinate points to form a first activity trajectory;

determining a grid coordinate point corresponding to a position point of the pet at the different time points on the Y axis from the origin along the time extension direction of the X axis in a second time period, and sequentially connecting the determined grid coordinate points to form a second activity trajectory;

determining a grid coordinate point corresponding to a position point of the pet at the different time points on the Y axis from the origin along the time extension direction of the X axis in a third time period, and sequentially connecting the determined grid coordinate points to form a third activity trajectory; and continuously recording an activity trajectory formed in each time period in the same manner.

7. The method as claimed in claim 6, wherein monitoring the pet according to the pet daily activity model comprises the following steps:

determining relatively dense activity trajectories according to an activity trajectory distribution condition in the pet daily activity model;

determining time points corresponding to the relatively dense activity trajectories as predicted stay time points, and determining grid coordinates corresponding to the relatively dense activity trajectories as predicted stay positions;

determining whether a straight-line distance between the pet and the robot is longer than a preset distance or not according to a present position of the robot and a present position of the pet;

when the straight-line distance is not longer than the preset distance, keeping a present tracking and monitoring state;

when the straight-line distance is longer than the preset distance, determining whether a time difference between a present time point and first predicted stay time point after the present time point is less than a set time period or not;

when the time difference is not less than the set time period, keeping the present tracking and monitoring state;

when the time difference is less than the set time period, determining the predicted stay position corresponding to the first predicted stay time point after the present time point, and determining a monitoring position point according to the present position of the pet and the predicted stay position such that a shooting angle of a camera of the robot covers the present position of the pet and the predicted stay position when the robot is at the monitoring position point; and controlling the robot to walk to the monitoring position point to monitor the pet.

8. The method as claimed in claim 7, wherein the relatively dense activity trajectories are activity trajectories in the same grid coordinate range in a certain time interval, and a ratio of the number of the relatively dense activity trajectories to the number of all activity trajectories in the same time interval is greater than a preset numerical value.

9. The method as claimed in claim 8, wherein keeping the present tracking and monitoring state comprises the following steps:

determining whether a distance between the robot and the pet is less than or equal to a set distance or not;

when the distance is not less than or equal to the set distance, re-determining the monitoring position point, and controlling the robot to walk to the monitoring position point to monitor the pet;

when the distance is less than or equal to the set distance, determining whether there is an obstacle cell or not in grid cells in a preset range covered by a shooting angle of a camera through which the robot monitors the pet between a grid cell where the robot is located and a grid cell where the pet is located;

when there is none obstacle cell in grid cells in the preset range, keeping the camera of the robot facing a shooting direction of the pet; and when there is the obstacle cell in grid cells in the preset range, re-determining the monitoring position point, and controlling the robot to walk to the monitoring position point to monitor the pet.

10. The method as claimed in claim 9, wherein re-determining the monitoring position point comprises the following steps:

determining a preset region taking the grid cell where the pet is located as a center point, determining passed cells as undetermined monitoring cells one by one from short to long distance relationships between the passed cells in the preset region and the robot, and determining whether there is an obstacle cell or not in a straight grid path between the undetermined monitoring cell and the grid cell where the pet is located;

when there is none obstacle cell in the straight grid path, determining the undetermined monitoring cell as a monitoring cell, and determining a center point of the monitoring cell as the monitoring position point;

when there is the obstacle cell in the straight grid path, determining whether the next passed cell is farthest from the robot or not;

when the next passed cell is farthest from the robot, directly determining the next passed cell as a monitoring cell, and determining a center point of the monitoring cell as the monitoring position point; and when the next passed cell is not farthest from the robot, determining the next passed cell as an undetermined monitoring cell, and continuing the step of determining whether there is the obstacle cell or not in the straight grid path between the undetermined monitoring cell and the grid cell where the pet is located, the obstacle cell being a corresponding grid cell when the robot detects an obstacle and the passed cell being a grid cell that the robot has passed.

11. The method as claimed in claim 7, wherein determining the monitoring position point according to the present position of the pet and the predicted stay position comprises the following steps:

Step 1: determining a grid cell corresponding to the present position of the pet as a first cell, and determining a grid cell corresponding to the predicted stay position as a second cell;

Step 2: determining a passed cell closest to the robot on a perpendicular bisector of a connecting line of the first cell and the second cell as a third cell;

Step 3: determining whether an included angle between a connecting line from the first cell to the third cell and a connecting line from the second cell to the third cell is smaller than the shooting angle of the camera of the robot or not;

when the included angle is not smaller than the shooting angle, entering Step 4;

Step 4: in an extension direction, far away from the first cell and the second cell, of the perpendicular bisector of the connecting line of the first cell and the second cell, sequentially determining passed cells arranged from short to long distances with the third cell as new third cells, and re-executing Step 3;

when the included angle is smaller than the shooting angle, entering Step 5;

Step 5: determining whether there is an obstacle cell or not in a straight grid path from the third cell to the first cell and whether there is an obstacle cell or not in a straight grid path from the third cell to the second cell;

when there is none obstacle cell in the straight grid path from the third cell to the first cell and there is none obstacle cell in the straight grid path from the third cell to the second cell, entering Step 6;

Step 6: determining a center point of a grid cell corresponding to the third cell as the monitoring position point;

when there is the obstacle cell in the straight grid path from the third cell to the first cell and/or there is the obstacle cell in the straight grid path from the third cell to the second cell, entering Step 7;

Step 7: in an extension direction of a parallel line passing through the third cell and parallel to the connecting line of the first cell and the second cell, sequentially determining passed cells that the parallel line passes through as new third cells, and determining whether the new third cell is a passed cell closest to a boundary of the grid map or not;

when the new third cell is not the passed cell closest to the boundary of the grid map, re-executing Step 5; and when the new third cell is the passed cell closest to the boundary of the grid map, sequentially determining passed cells arranged from short to long distances with the passed cell closest to the robot on the perpendicular bisector of the connecting line of the first cell and the second cell as new third cells, and re-executing Step 5.

12. The method as claimed in claim 7, wherein controlling the robot to walk to the monitoring position point to monitor the pet comprises the following steps:

searching the grid map by taking the present position point of the robot as a starting point and taking a direction pointed from the present position point to the monitoring cell as a searching direction;

determining a grid path with a shortest path length in grid paths directly connected by passed cells between the present position point of the robot and a center point of the monitoring cell as a navigation grid path;

determining center points of the grid cells in the navigation grid path as navigation position points, and connecting the navigation position points into a navigation path;

controlling the robot to walk along the navigation path from the present position point to the monitoring position point; and regulating a direction of the robot to ensure that the shooting direction of the camera of the robot points to a direction of the pet.

13. The method as claimed in claim 8, wherein controlling the robot to walk to the monitoring position point to monitor the pet comprises the following steps:

searching the grid map by taking the present position point of the robot as a starting point and taking a direction pointed from the present position point to the monitoring cell as a searching direction;

determining a grid path with a shortest path length in grid paths directly connected by passed cells between the present position point of the robot and a center point of the monitoring cell as a navigation grid path;

determining center points of the grid cells in the navigation grid path as navigation position points, and connecting the navigation position points into a navigation path;

controlling the robot to walk along the navigation path from the present position point to the monitoring position point; and regulating a direction of the robot to ensure that the shooting direction of the camera of the robot points to a direction of the pet.

14. The method as claimed in claim 9, wherein controlling the robot to walk to the monitoring position point to monitor the pet comprises the following steps:

searching the grid map by taking the present position point of the robot as a starting point and taking a direction pointed from the present position point to the monitoring cell as a searching direction;

determining a grid path with a shortest path length in grid paths directly connected by passed cells between the present position point of the robot and a center point of the monitoring cell as a navigation grid path;

determining center points of the grid cells in the navigation grid path as navigation position points, and connecting the navigation position points into a navigation path;

controlling the robot to walk along the navigation path from the present position point to the monitoring position point; and regulating a direction of the robot to ensure that the shooting direction of the camera of the robot points to a direction of the pet.

15. The method as claimed in claim 10, wherein controlling the robot to walk to the monitoring position point to monitor the pet comprises the following steps:

searching the grid map by taking the present position point of the robot as a starting point and taking a direction pointed from the present position point to the monitoring cell as a searching direction;

determining a grid path with a shortest path length in grid paths directly connected by passed cells between the present position point of the robot and a center point of the monitoring cell as a navigation grid path;

determining center points of the grid cells in the navigation grid path as navigation position points, and connecting the navigation position points into a navigation path;

controlling the robot to walk along the navigation path from the present position point to the monitoring position point; and regulating a direction of the robot to ensure that the shooting direction of the camera of the robot points to a direction of the pet.

\* \* \* \* \*